March 9, 1965 J. H. STARR 3,173,002
METHOD AND APPARATUS FOR DETERMINING ALLOCATION OF POWER INPUTS
Filed April 25, 1960 5 Sheets-Sheet 1
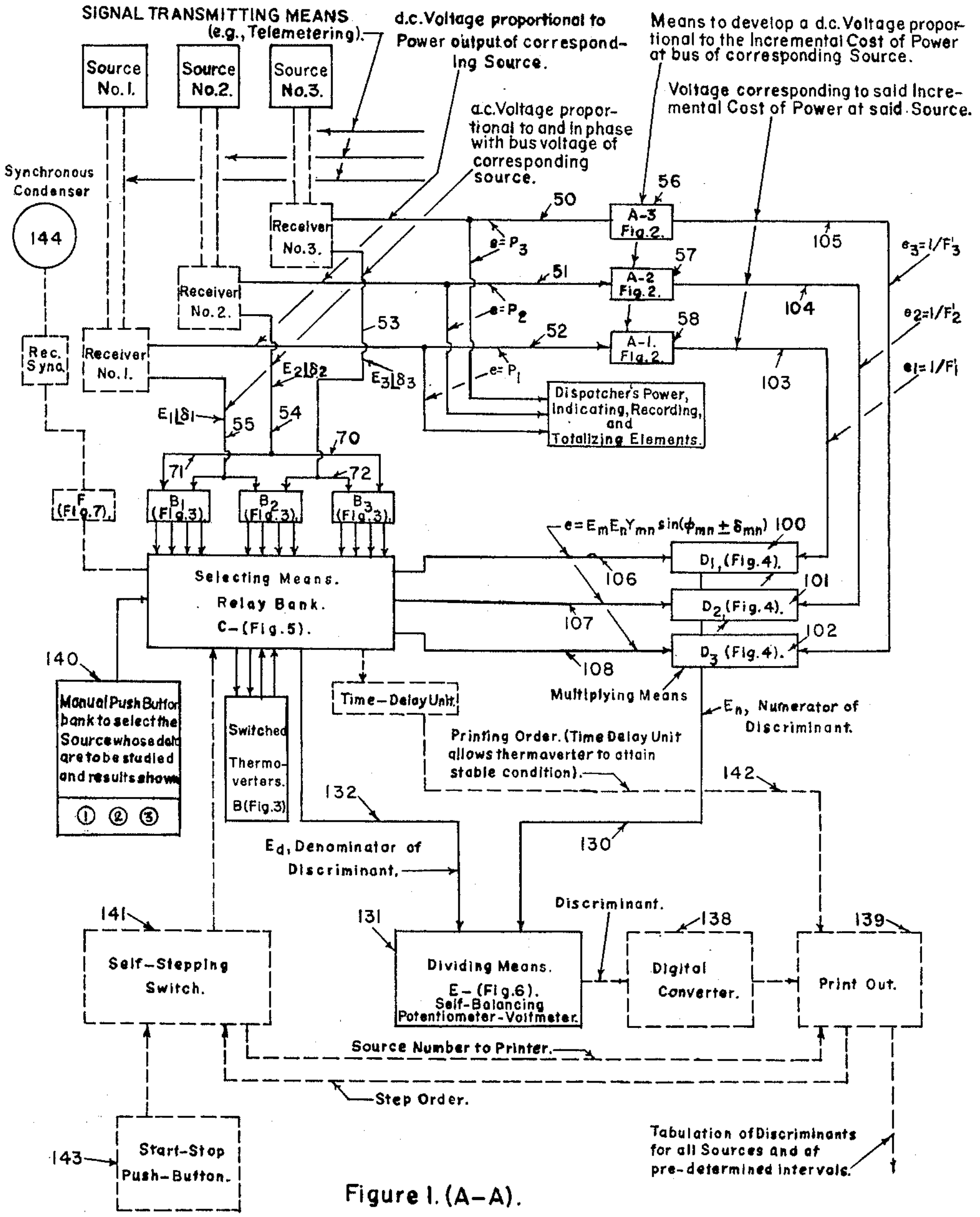
Figure 1. (A-A).
One Embodiment of Three-Power-Source Allocator.
Inventor:
James H. Starr,
by [signature] Atty.

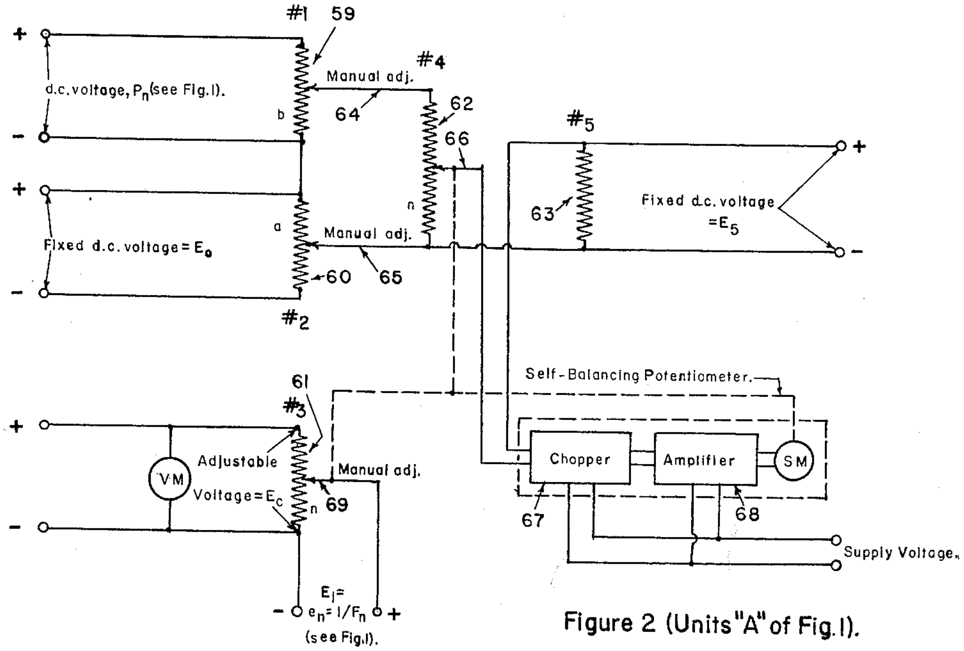
Figure 2 (Units "A" of Fig. I).
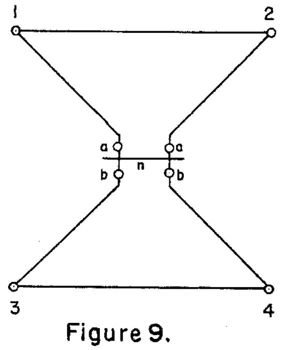
Figure 9.
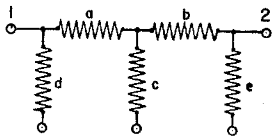
Figure 10.
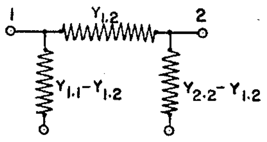
Figure 11.
Inventor:
James H. Starr,
by [signature]
Atty.

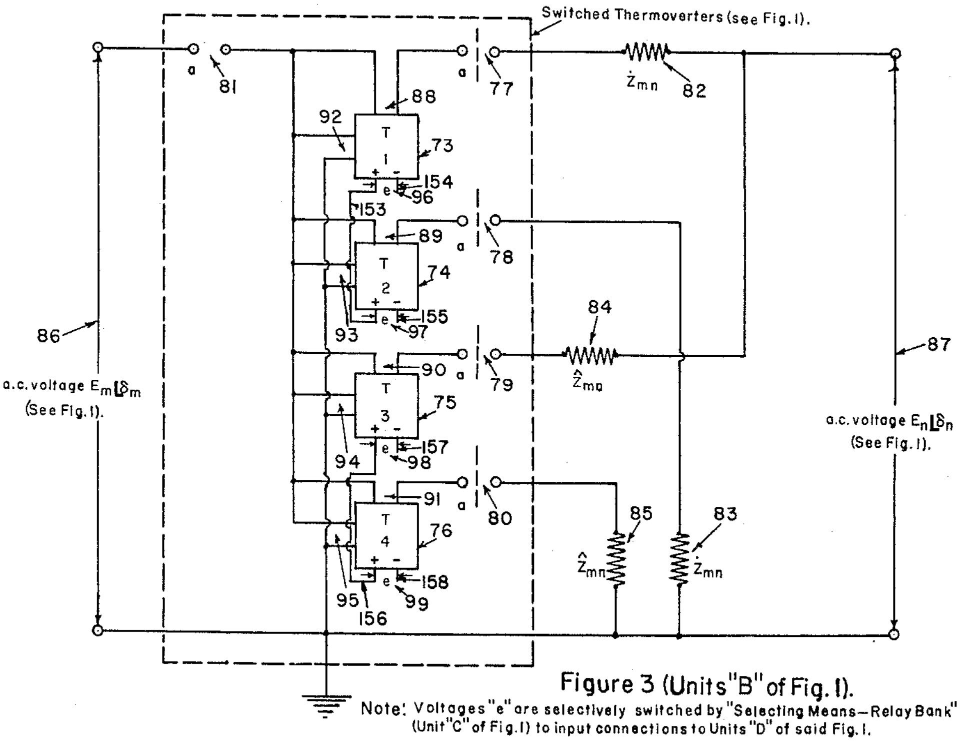
Figure 3 (Units "B" of Fig. 1).
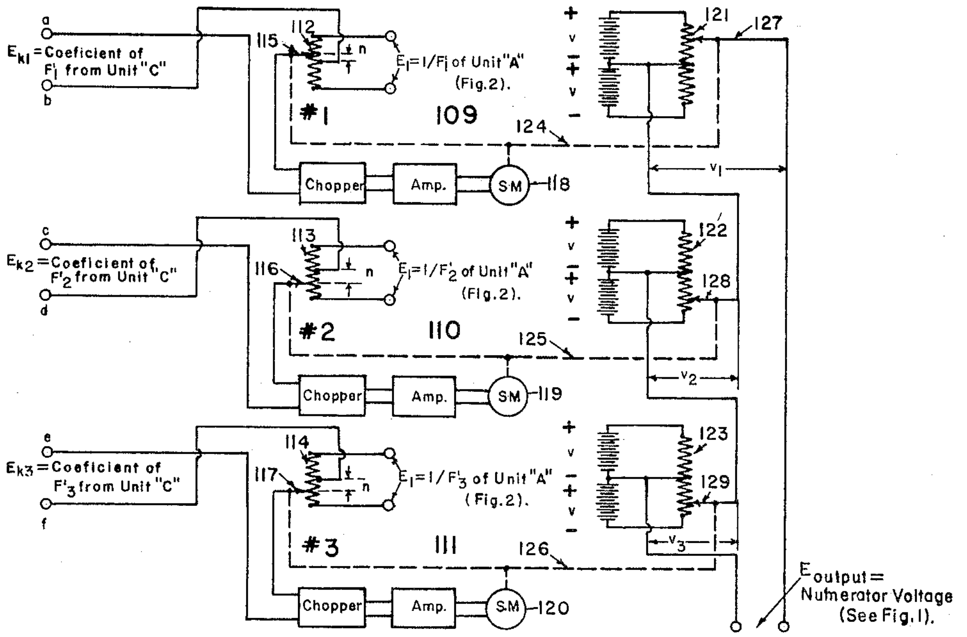
Figure 4 (Units "D" of Fig. 1).
Inventor:
James H. Starr,
by [signature] Atty.

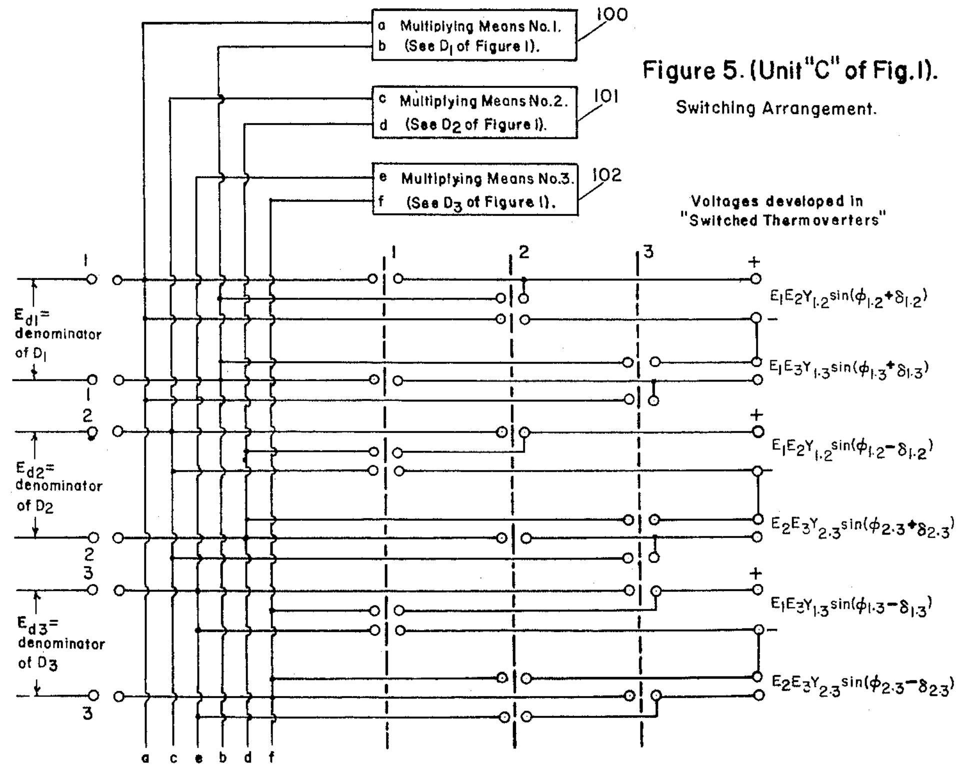
Figure 5. (Unit "C" of Fig. 1).
Switching Arrangement.
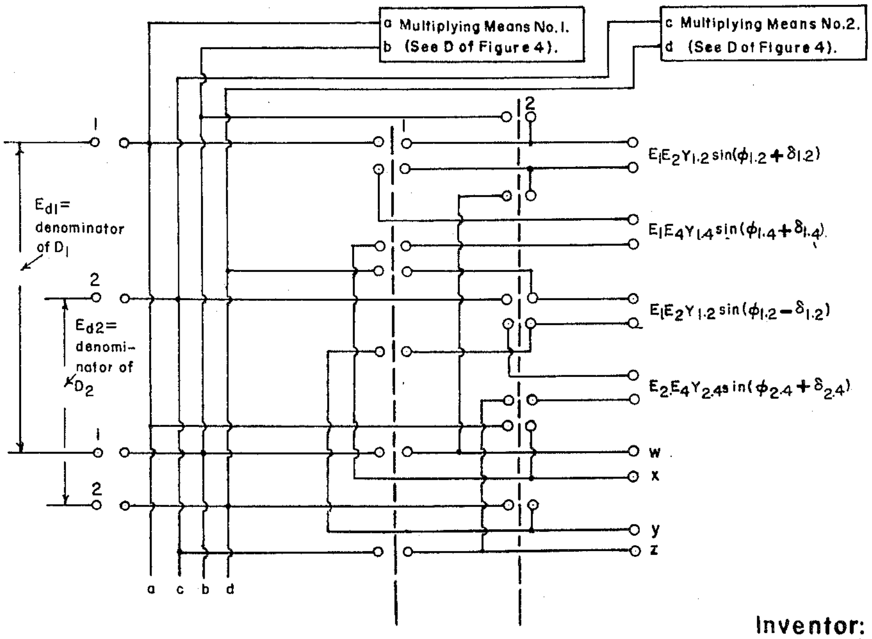
Figure 8. (Alternative Unit "C").
Switching Arrangement. (Usable when a synchronous condenser is added to the system. (e.g. See Fig. 1.))
Inventor:
James H. Starr,
by [signature] Atty.

(Unit "E" of Fig. 1).

(Unit "F" of Fig. 1).
(Usable when a synchronous condenser is added to the system. (e.g. See Fig. 1).)

Inventor:
James H. Starr,
by [signature] Atty.

United States Patent Office 3,173,002

Patented Mar. 9, 1965

3,173,002

METHOD AND APPARATUS FOR DETERMINING ALLOCATION OF POWER INPUTS

James H. Starr, 345 N. Spring Ave., La Grange Park, Ill.

Filed Apr. 25, 1960, Ser. No. 24,622

5 Claims. (Cl. 235—184)

As is well known, the transmission of electric power from the point of generation to the point of sale and use, is accompanied by a loss of energy. Thus it is necessary to generate and supply to the power transmission circuits more power than can be withdrawn from such transmission circuits for sale or use at a remote point. The ratio of the power which it is necessary to generate compared to that which it is possible to withdraw for useful purposes depends on many factors, an important one of which is the distance between the point of generation and the point of use.

It is also recognized that, as a consequence of relative efficiency of furnaces, boilers, turbines, and the like, as well as such significant factors as temperature of available cooling water and cost of fuel delivered at the site, the cost of power at the point of generation will vary significantly from one power source to another.

In the operation of a large and complex electric power system, it is a matter of major consequence that the cost of fuel consumed per hour be, as closely as practicable, the minimum consistent with delivery to each power consumer of the amount of power which that consumer requires at each instant of time. The attainment of minimum fuel cost operation is possible only through the allocation of the total system power load among the several available power sources in a manner to satisfy certain necessary and sufficient conditions which have been expresed mathematically by various contributors to the established art. The present state of the art, as of 1952, is reviewed mathematically in AIEE paper 52–112 which, with a accompanying bibliography, quite thoroughly explores the problem of load allocation for minimum hourly fuel cost. In common with all other published treatments of the subject which are in general use, AIEE paper 52–112 recognizes and defines certain relations between hourly fuel cost, incremental cost of generated power, and incremental cost of net delivered power; and expresses the necessary and sufficient conditions for minimum hourly fuel cost in terms including a quantity defined as incremental transmission loss. In the paper, and the references which it mentions, there are described methods and techniques of computation through which this incremental transmission loss quantity may be determined so that it may, in turn, be employed in establishing the optimum allocation of power system load among the available sources. These methods and techniques are predicated on four simplifying assumptions, itemized in the paper, which seriously detract from the generality of the methods, and which can, and not infrequently do, lead to erroneous results. Further the computation of the loss formula coefficients for an extensive power system involves the use of sophisticated computer equipment for protracted periods, which is both expensive and inconvenient.

Subsequent disclosures (AIEE papers 54–65, and 57–680, and Letters Patents of the United States, Nos. 2,836,358, issued to me and Clark, May 27, 1958, and 2,829,829, issued to me and Clark, April 8, 1958) are directed to improvements in methods of determining incremental transmission losses, either through disclosure of a specialized form of computer, or in the form of the computer input data; but it is important to note that, without exception, these improvements are directed to apparaus and techniques for determination of the incremental loss coefficients or incremental loss data in some modified form. The actual allocaiton of load continues, in all instances, to be predicated upon relations as summarized in paper 52–112 in which incremental transmission loss is a major parameter.

The presently disclosed method and apparatus are directed to an indicating and/or recording instrument continuously supplied with input data through suitable connections to the power system and directly indicating on a suitable scale, or otherwise, the increase or decrease in total system hourly fuel cost in dollars per hour per megawatt incident to an increment in power output at any specific source. When the cost increment indication is adjusted to zero for each individual source simultaneously, the total system fuel cost may be shown to be a minimum. This operation is accomplished without use of incremental transmission loss as a parameter, involves no restrictive assumptions, and is, consequently completely general and completely rigorous. No computer is required except in the preparations of data prior to manufacture of the desired structure. Provision can be readily included to directly indicate the incremental cost of power delivered at any specific load at any instant for billing or accounting purposes.

In order to facilitate an understanding of the operations presently to be desceribed in detail hereinafter, and to show the relation of various elements of equipments to each other to enable production of the desired end results; and also to disclose the correctness of the disclosed operations for production of end results which will truly and faithfully show the correctness of such operations as related to each other in such elements of equipment, for production of such end results, I shall presently present the mathematical analysis on which such operations are based. To facilitate an understanding of such mathematical study and analysis the following statement is first included.

Said mathematical development progresses as follows:

(1) Represent each power system load by an equivalent impedance.

(2) Represent the complete power system by an equivalent mesh having one point of entry for each power source or metered interconnection.

(3) Write the equations for power flow into the network at each point of entry in admittance form.

(4) Write the equation for total fuel cost in terms of fuel cost at each source and power supplies at each source.

(5) Find the complete differential of item 4 by partial differentiation with respect to the angles of the voltage vectors at each point of entry.

(6) Equate the derivative of total fuel cost with respect to the angle of the voltage vector at one source to zero, and repeat for each source in turn. Each of this group of equations is a necessary condition for minimum total fuel cost.

(7) Examine the higher order derivatives of total fuel cost and establish that the conditions of item 6 are also sufficient conditions for minimum fuel cost.

(8) Take the partial derivative of each equation of item 3 with respect to the angle of the voltage vector of that source.

(9) Write the derivative of total fuel cost with respect to voltage angle for each source in turn, from item 6; divided by the derivative of power flow into the network with respect to voltage angle for that same source, from item 8; as the expression for a discriminant for that source.

This discriminant is the increment in total fuel cost in dollars per hour, per megawatt transferred to the specific source to which it applies by advance in the angle of the voltage vector at that source.

(10) Write additional expressions of the same form as item 9 for each interconnection point when power is flowing out of the system at that point. These equations give the incremental cost of delivered power at the interconnection.

(11) Develop proof that two systems interconnected at one point operate at minimum total fuel cost for both when the incremental cost of power delivered at the interconnection is the same for both systems.

(12) Develop additional equations showing the effect of a synchronous condenser on the family of partial derivatives of item 8, and, thereby, on subsequent items.

Every one of the twelve steps above is completely rigorous and is limited only by the restriction stated. These restrictions are, item by item:

(1) Each load is represented by a constant impedance. Under steady state condition any load may be replaced by an exactly equivalent impedance. However, a constant impedance is not, in general, the exact equivalent of a load unless the load terminal voltage is constant in magnitude.

(2) The equivalent mesh is the exact equivalent of the system so long as all load impedances are constant. This is not true, in general, if load impedances vary with variation in load terminal voltage, unless all loads are at points of entry.

(5) The partial differentiation is exact if the voltage magnitude at all points of entry and all system impedances, including load impedances, remain constant. This is not true, in general, if load impedances vary with terminal voltage.

(10) Voltage at the interconnection points remain fixed in magnitude, the power requirements of the interconnection being varied, through variation in voltage vector angle only. This is not true, in general, unless voltage at the interconnection point is maintained constant, as would be the case if there were a synchronous machine, suitably controlled, at the interconnection point.

(12) The synchronous condenser is considered to operate at constant terminal voltage and constant loss. No restriction is placed on variation of reactive kva. output. The condition is closely approximated by some forms of regulating equipment often employed in synchronous condenser installation.

The restrictions of items 1, 2 and 5 are necessary because:

(*a*) Actual electrical system loads do vary in impedance as the load terminal voltage varies. The impedance variation is zero for a passive impedance load, but is a relatively complex function of terminal voltage for other types of load, particularly motor loads.

(*b*) The data which can, at any reasonable cost, be continuously monitored may include voltage, power, and reactive volt-amperes at selected points. It cannot include the performance characteristics at each motor or other type of load, nor, to any reasonable degree of approximation, the composite performance characteristics of each group of individual loads concentrated at specific locations, and subject to change from hour to hour.

(*c*) An rigorous mathematical treatment must be predicated on parameters which can be specifically defined. In this instance no exact definition of load characteristics is available so one must be assigned. The alternative is a loss of rigor in the mathematical development, the consequences of which are not predictable.

The restrictions of items 1, 2 and 5 do not detract from the value of the discriminants as a basis for allocating load because, (*A*) Except for unavoidable errors of a practical nature in input data or in the instruments themselves, the discriminant indications at any instant are true indications of the increment in fuel cost incident to the transfer of power to any source with all load impedances fixed at existing values.

(*B*) When a block of power is transferred, in compliance with indicated discriminant magnitudes and signs, the load impedances will not remain exactly constant and, consequently, the indicated cost advantage may not be exactly realized. But the values of the discriminants will change during the transfer so that, at all times, they conform to item A above.

(*C*) When all discriminants are equal to zero, indicating that the allocation corresponding to minimum total fuel cost has been attained, any further power transfer must result in an increase in total fuel cost accompanied by a change in net delivered load which may be positive or negative. If the load change is positive it will partially offset the effect of the increase in fuel cost in its effect on incremental cost, but total fuel cost will increase.

The restriction of item 10 is necessary because, (*A'*) Unless the voltage at every point of entry is held constant, the operation of item 5 results in expressions of such complexity that they cannot be represented in a physical structure of practicable size or cost. A point of interconnection to an adjacent power system is, of necessity, a point of entry as of item 2.

The restriction of item 10 does not detract from the practical value of the indicated incremental cost of delivered power because (*a'*) In an actual system interconnection the power increment may be expected to occur in conjunction with increments in reactive kva., voltage, and phase position in any of an infinite number of possible combinations, and, probably, never twice in exactly the same manner.

(*b'*) As previously stated, it is essential that all parameters be specifically defined. Since the kva. increment at an interconnection point is a random quantity some arbitrary definition must be assigned. The definition selected is closely in accord with normal operating practice and provides a consistent basis for comparison of incremental costs for various locations.

The equations developed under item 12 are exact under the conditions stated. It should be mentioned that in some, possibly many instances, no significant error will result if the synchronous condenser is treated as a constant reactance load instead of employing the more sophisticated equations developed in this item. If the simpler constant reactance treatment is adopted it is apparent that a different type of control is presumed, one which will maintain constant equivalent impedance instead of constant terminal voltage.

The mathematical development of the operations incident to practice of my present invention are as follows:

Let $C_1$ equal Hourly fuel cost at Source 1; equal to $F_1(P_1)$, a function of power output at Source 1;

$C_2$ equal Hourly fuel cost at Source 2; equal to $F_2(P_2)$, a function of power output at Source 2;

$C_3$ equal Hourly fuel cost at Source 3; equal to $F_3(P_3)$, a function of power output at Source 3;

C equals $C_1$ plus $C_2$ plus $C_3$ equals total hourly fuel cost;

$\dot{E}_1$ equals $E_1\angle\delta_1$ equals vector voltage at Source 1;

$\dot{E}_2$ equals $E_2\angle\delta_2$ equals vector voltage at Source 2;

$\dot{E}_3$ equals $E_3\angle\delta_3$ equals vector voltage at Source 3;

$P_1$ equals $f_1(\delta_1,\delta_2,\delta_3)$ equals a function of the voltage phase position at constant voltage magnitude;

$P_2$ equals $f_2(\delta_1,\delta_2,\delta_3)$ equals a function of the voltage phase position at constant voltage magnitude;

$P_3$ equals $f_3(\delta_1,\delta_2,\delta_3)$ equals a function of the voltage phase position at constant voltage magnitude.

Then $$C=F_1[f_1(\delta_1,\delta_2,\delta_3)]+F_2[f_2(\delta_1,\delta_2,\delta_3)]+F_3[f_3(\delta_1,\delta_2,\delta_3)]$$

By the methods of classical mathematics; see for example,

Margenau & Murphy, "The Mathematics of Physics and Chemistry," D. Van Nostrand, Chapter 1:

$$dC=\left[\frac{\partial C}{\partial P_1}\frac{\partial P_1}{\partial \delta_1}+\frac{\partial C}{\partial P_2}\frac{\partial P_2}{\partial \delta_1}+\frac{\partial C}{\partial P_3}\frac{\partial P_3}{\partial \delta_1}\right]d\delta_1+\left[\frac{\partial C}{\partial P_1}\frac{\partial P_1}{\partial \delta_2}+\frac{\partial C}{\partial P_2}\frac{\partial P_2}{\partial \delta_2}+\frac{\partial C}{\partial P_3}\frac{\partial P_3}{\partial \delta_2}\right]d\delta_2+\left[\frac{\partial C}{\partial P_1}\frac{\partial P_1}{\partial \delta_3}+\frac{\partial C}{\partial P_2}\frac{\partial P_2}{\partial \delta_3}+\frac{\partial C}{\partial P_3}\frac{\partial P_3}{\partial \delta_3}\right]d\delta_3$$

$$\frac{\partial C}{\partial P_1}=\frac{\partial F_1(P_1)}{\partial P_1}+\frac{\partial F_2(P_2)}{\partial P_1}+\frac{\partial F_3(P_3)}{\partial P_1}=\frac{\partial F_1(P_1)}{\partial P_1}=F_1^1$$

$$\frac{\partial C}{\partial P_2}=\frac{\partial F_1(P_1)}{\partial P_2}+\frac{\partial F_2(P_2)}{\partial P_2}+\frac{\partial F_3(P_3)}{\partial P_2}=\frac{\partial F_2(P_2)}{\partial P_2}=F_2^1$$

$$\frac{\partial C}{\partial P_3}=\frac{\partial F_1(P_1)}{\partial P_3}+\frac{\partial F_2(P_2)}{\partial P_3}+\frac{\partial F_3(P_3)}{\partial P_3}=\frac{\partial F_3(P_3)}{\partial P_3}=F_3^1$$

$$dC=\left[\frac{\partial P_1}{\partial \delta_1}d\delta_1+\frac{\partial P_1}{\partial \delta_2}d\delta_2+\frac{\partial P_1}{\partial \delta_3}d\delta_3\right]F_1^1+\left[\frac{\partial P_2}{\partial \delta_1}d\delta_1+\frac{\partial P_2}{\partial \delta_2}d\delta_2+\frac{\partial P_2}{\partial \delta_3}d\delta_3\right]F_2^1+\left[\frac{\partial P_3}{\partial \delta_1}d\delta_1+\frac{\partial P_3}{\partial \delta_2}d\delta_2+\frac{\partial P_2}{\partial \delta_3}d\delta_3\right]F_3^1$$

$$\frac{dC}{d\delta_1}=F_1^1\frac{\partial P_1}{\partial \delta_1}+F_2^1\frac{\partial P_2}{\partial \delta_1}+F_3^1\frac{\partial P_3}{\partial \delta_1}=0 \quad \text{when } d\delta_2=d\delta_3=0$$

$$\frac{dC}{d\delta_2}=F_1^1\frac{\partial P_1}{\partial \delta_2}+F_2^1\frac{\partial P_2}{\partial \delta_2}+F_3^1\frac{\partial P_3}{\partial \delta_2}=0 \quad \text{when } d\delta_1=d\delta_3=0$$

$$\frac{dC}{d\delta_3}=F_1^1\frac{\partial P_1}{\partial \delta_3}+F_2^1\frac{\partial P_2}{\partial \delta_3}+F_3^1\frac{\partial P_3}{\partial \delta_3}=0 \quad \text{when } d\delta_1=d\delta_2=0$$

The above three equations state three necessary, but not sufficient conditions that the total hourly fuel cost is to be a minimum. The three additional conditions required for sufficiency are, classically:

$$\frac{\partial^2 C}{\partial \delta_1^2}>0, \text{ and } \frac{\partial^2 C}{\partial \delta_2^2}>0, \text{ and } \frac{\partial^2 C}{\partial \delta_1 \partial \delta_2}<\frac{\partial^2 C}{\partial \delta_1^2}\frac{\partial^2 C}{\partial \delta_2^2}$$

It can be demonstrated that these three conditions are satisfied and, therefore, the three preceding equations are both necessary and sufficient conditions for minimum fuel cost. Further:

$$dP_1=\frac{\partial P_1}{\partial \delta_1}d\delta_1+\frac{\partial P_1}{\partial \delta_2}d\delta_2+\frac{\partial P_1}{\partial \delta_3}d\delta_3$$

$$dP_2=\frac{\partial P_2}{\partial \delta_1}d\delta_1+\frac{\partial P_2}{\partial \delta_2}d\delta_2+\frac{\partial P_2}{\partial \delta_3}d\delta_3$$

$$dP_3=\frac{\partial P_3}{\partial \delta_1}d\delta_1+\frac{\partial P_3}{\partial \delta_2}d\delta_2+\frac{\partial P_3}{\partial \delta_3}d\delta_3$$

$$\frac{\frac{dC}{d\delta_1}}{\frac{dP_1}{d\delta_1}}=\frac{F_1^1\frac{\partial P_1}{\partial \delta_1}+F_2^1\frac{\partial P_2}{\partial \delta_1}+F_3^1\frac{\partial P_3}{\partial \delta_1}}{\frac{\partial P_1}{\partial \delta_1}}=\frac{\text{increment in total fuel cost incident to an increment in } \delta_1}{\text{increment in power output at source 1 incident to an increment in } \delta_1}$$

when $d\delta_2=d\delta_3=0$

If this expression is positive it indicates that any increase in output at Source 1, the load impedances remaining constant, will result in an increase in total hourly fuel cost; and, if negative, in a decrease. This discriminant is in units of (plus or minus) dollars per hour per megawatt. If it is zero it is an indication that the existing loading of that source is the optimum under conditions currently existing. The expression gives no direct indication of the possible effect on total fuel cost of adjustments in the output at other sources, but there is a similar equation for each source which forms the discriminant for that source. In the three source case the three discriminants are $$\frac{\frac{dc}{d\delta_1}}{\frac{dP_1}{d\delta_1}}=\frac{F_1'\frac{\partial P_1}{\partial \delta_1}+F_2'\frac{\partial P_2}{\partial \delta_1}+F_3'\frac{\partial P_3}{\partial \delta_1}}{\frac{\partial P_1}{\partial \delta_2}}=D_1$$

$$\frac{\frac{dc}{d\delta_2}}{\frac{dP_2}{d\delta_2}}=\frac{F_1'\frac{\partial P_1}{\partial \delta_2}+F_2'\frac{\partial P_2}{\partial \delta_2}+F_3'\frac{\partial P_3}{\partial \delta_2}}{\frac{\partial P_2}{\partial \delta_2}}=D_2$$

$$\frac{\frac{dc}{d\delta_3}}{\frac{dP_3}{d\delta_3}}=\frac{F_1'\frac{\partial P_1}{\partial \delta_3}+F_2'\frac{\partial P_2}{\partial \delta_3}+F_3'\frac{\partial P_3}{\partial \delta_3}}{\frac{\partial P_3}{\partial \delta_3}}=D_3$$

Then, in accordance with accepted standard definitions (see any text on network analysis) let $\dot{Y}_{11}=Y_{11}\underline{/-\phi_{11}}$ = driving point admittance at source 1

$\dot{Y}_{22}=Y_{22}\underline{/-\phi_{22}}$ = driving point admittance at source 2

$\dot{Y}_{33}=Y_{33}\underline{/-\phi_{33}}$ = driving point admittance at source 3

$\dot{Y}_{12}=Y_{12}\underline{/-\phi_{12}}$ = transfer admittance between source 1 and source 2

$\dot{Y}_{23}=Y_{23}\underline{/-\phi_{23}}$ = transfer admittance between source 2 and source 3

$\dot{Y}_{13}=Y_{13}\underline{/\phi-_{13}}$ = tranfer admittance between source 1 and source 3

$\delta_{12}=\delta_1-\delta_2$, et cetera $\delta_{21}=-\delta_{12}=\delta_2-\delta_1$, et cetera For convenience let $\delta_1>\delta_2>\delta_3$. This is not a limitation on generality as, if $\delta_1$ is actually $<\delta_2$ then $\delta_{12}$ will be a negative quantity and, when so inserted in the following equations, will lead to results correct in magnitude and sign.

It can be shown that the following well known equations apply;

$$P_1=E_1^2Y_{11}\cos\phi_{11}-E_1E_2Y_{12}\cos(\phi_{12}+\delta_{12})-E_1E_3Y_{13}\cos(\phi_{13}+\delta_{13})$$

$$P_2=E_2^2Y_{22}\cos\phi_{22}-E_1E_2Y_{12}\cos(\phi_{12}-\delta_{12})-E_2E_3Y_{23}\cos(\phi_{23}+\delta_{23})$$

$$P_3=E_3^2Y_{33}\cos\phi_{33}-E_1E_3Y_{13}\cos(\phi_{13}-\delta_{13})-E_2E_3Y_{23}\cos(\phi_{23}-\delta_{23})$$

The partial derivatives are found to be:

$$\frac{\partial P_1}{\partial \delta_1}=E_1E_2Y_{12}\sin(\phi_{12}+\delta_{12})+E_1E_3Y_{13}\sin(\phi_{13}+\delta_{12})$$

$$\frac{\partial P_1}{\partial \delta_2}=-E_1E_2Y_{12}\sin(\phi_{12}+\delta_{12})$$

$$\frac{\partial P_1}{\partial \delta_3}=-E_1E_3Y_{13}\sin(\phi_{13}+\delta_{13})$$

$$\frac{\partial P_2}{\partial \delta_1}=-E_1E_2Y_{12}\sin(\phi_{12}-\delta_{12})$$

$$\frac{\partial P_2}{\partial \delta_2}=E_1E_2Y_{12}\sin(\phi_{12}-\delta_{12})+E_2E_3Y_{23}\sin(\phi_{23}+\delta_{23})$$

$$\frac{\partial P_2}{\partial \delta_3}=-E_2E_3Y_{23}\sin(\phi_{23}+\delta_{23})$$

$$\frac{\partial P_3}{\partial \delta_1}=-E_1E_3Y_{13}\sin(\phi_{13}-\delta_{13})$$

$$\frac{\partial P_3}{\partial \delta_2}=-E_2E_3Y_{23}\sin(\phi_{23}-\delta_{23})$$

$$\frac{\partial P_3}{\partial \delta_3}=E_1E_3Y_{13}\sin(\phi_{13}-\delta_{13})+E_2E_3Y_{23}\sin(\phi_{23}-\delta_{23})$$

The three discriminants previously developed may now be written in more usable form as $D_1=$ $$\frac{F_1'[E_1E_2Y_{12}\sin(\phi_{12}+\delta_{12})+E_1E_3Y_{13}\sin(\phi_{13}+\delta_{13})]-F_2'[E_1E_2Y_{12}\sin(\phi_{12}-\delta_{12})]-F_3'[E_1E_3Y_{13}\sin(\phi_{13}-\delta_{13})]}{E_1E_2Y_{12}\sin(\phi_{12}+\delta_{12})+E_1E_3Y_{13}\sin(\phi_{13}+\delta_{13})}$$

equals change in total system fuel cost due to transfer of load to Source 1, in dollars per hour per megawatt transferred equals zero when Source 1 is loaded for minimum total fuel cost. $D_2=$ $$\frac{-F_1'[E_1E_2Y_{12}\sin(\phi_{12}+\delta_{12})]+F_2'[E_1E_2Y_{12}\sin(\phi_{12}+\delta_{12})+E_2E_3Y_{23}\sin(\phi_{23}+\delta_{23})]-F_3'[E_2E_3Y_{23}\sin(\phi_{23}-\delta_{23}]}{E_1E_2Y_{12}\sin(\phi_{12}-\delta_{12})+E_2E_3Y_{23}\sin(\phi_{23}+\delta_{23})}$$

equals change in total system fuel cost due to transfer of load to Source 2 equals zero when Source 2 is loaded for minimum total fuel cost. $D_3=$ $$\frac{-F_1'[E_1E_3Y_{13}\sin(\phi_{13}+\delta_{13})]-F_2'[E_2E_3Y_{23}\sin(\phi_{23}+\delta_{23})]+F_3'[E_1E_3Y_{13}\sin(\phi_{13}-\delta_{13})+E_2E_3Y_{23}\sin(\phi_{23}-\delta_{23})]}{E_1E_3Y_{13}\sin(\phi_{13}-\delta_{13})+E_2E_3Y_{23}\sin(\phi_{23}-\delta_{23})}$$

equals change in total system fuel cost due to transfer of load to Source 3 equals zero when Source 3 is loaded for minimum total fuel cost.

At this point there become available two paths along either of which the analysis may proceed. Both are rigorous and completely general, although leading to slightly different physical structures for instrumentation. Each offers advantages in particular configurations of sources.

The most obvious procedure is to provide a structure which directly measures the nine partial derivatives listed immediately above, multiplies a selected three thereof each by the appropriate F′, adds the products and divides the sum by the proper single partial derivative to obtain one of the three discriminants mathematically developed in the foregoing. Such structure is disclosed in block diagram form in FIGURE 1 (A—A), and is fully described in the pertinent sections of the specification to follow.

A desirable (but not to be considered as a limiting) end result to be attained, is the display on a suitable scale, and/or printed record, of the several, in this case three, discriminants as they exist at the moment. The mathematical foundation for certain additional features will now be established.

In addition to operating a power system at minimum hourly fuel costs, it is frequently desirable to be able to directly meter the incremental cost of delivered power at a specific location, such as a large load or a point of interconnection to an adjacent system, for accounting purposes or as a basis for billing.

A point of interconnection is at all times a possible source of received power, and is regarded as a generating station with an incremental cost F′ as determined from the power interchange contract. However, when it is a load the point of interest may be the incremental cost of power delivered there as compared to the compensation received for that power increment in accordance with the contract. In the structure later to be desired herein it is shown that, by simple switching, the structure elements necessary to include the effect of the interconnection on load allocation at which power may be received at a stipulated contract cost, may be reconnected to directly indicate the incremental cost of power delivered to the interconnection when the flow is reversed.

Consider the case of a load supplied from bus $n$ which is not a source, and let the voltage at bus $n$ at a specific instant be $\dot{E}_n=E_n\angle\delta_n$ where $\delta_1>\delta_2>\delta_3>\delta_n$. Then any increment in $\delta_n$ while $d\delta_1=d\delta_2=d\delta_3=0$, and:

$$\frac{dC}{d\delta_n}=F_1'\frac{\partial P_1}{\partial \delta_n}+F_2'\frac{\partial P_2}{\partial \delta_n}+F_3'\frac{\partial P_3}{\partial \delta_n}$$

and $$\frac{\frac{dC_n}{d\delta_n}}{\frac{dP_n}{d\delta_n}}=\frac{F_1'\frac{\partial P_1}{\partial \delta_n}+F_2'\frac{\partial P_2}{\partial \delta_n}+F_3'\frac{\partial P_3}{\partial \delta_n}}{\frac{\partial P_n}{\partial \delta_n}}=\text{incremental cost of delivered power}$$

at bus $n$ under existing system conditions. In a manner similar to that previously employed it can be shown:

$$\frac{\partial P_1}{\partial \delta_n}=-E_1E_nY_{1n}\sin(\phi_{1n}+\delta_{1n})$$

$$\frac{\partial P_2}{\partial \delta_n}=-E_2E_nY_{2n}\sin(\phi_{2n}+\delta_{2n})$$

$$\frac{\partial P_3}{\partial \delta_n}=-E_3E_nY_{3n}\sin(\phi_{3n}+\delta_{3n})$$

$$\frac{\partial P_n}{\partial \delta_n}=E_1E_nY_{1n}\sin(\phi_{1n}-\delta_{1n})+E_2E_nY_{2n}\sin(\phi_{2n}-\delta_{2n})+E_3E_nY_{3n}\sin(\phi_{3n}-\delta_{3n})$$

In the above equation, power flow to the system is considered positive. As $dP_n$ is negative for an increase in load from the system at $n$, all four partial derivatives are positive quantities, and the incremental cost is, of course, positive. By providing the metering structure necessary to measure these four partial derivatives in addition to that provided for purposes of load allocation, the incremental cost of power at load bus $n$ is directly meterable.

Now consider a system of four sources arranged as in 9. Note that the system may be regarded as two separate systems interconnected at bus $n$. If switches $b$—$b$ are open, then for the upper system, system $a$, alone:

$$dP_{n(a)}=\frac{\partial P_n}{\partial \delta_1}d\delta_1+\frac{\partial P_n}{\partial \delta_2}d\delta_2+\frac{\partial P_n}{\partial \delta_n}d\delta_n$$

$$dC=F_1'\left[\frac{\partial P_1}{\partial \delta_1}d\delta_1+\frac{\partial P_1}{\partial \delta_2}d\delta_2\frac{\partial P_1}{\partial \delta_n}d\delta_n\right]+F_2'\left[\frac{\partial P_2}{\partial \delta_1}d\delta_1+\frac{\partial P_2}{\partial \delta_2}d\delta_2+\frac{\partial P_2}{\partial \delta_n}d\delta_n\right]$$

and, if $d\delta_1=d\delta_2=0$:

$$dP_{n(a)}=[E_1E_nY_{1n}\sin(\phi_{1n}-\delta_{1n})+E_2E_nY_{2n}\sin(\phi_{2n}-\delta_{2n})]\delta_n$$

Similarly, if the switches $a$—$a$ are open, the equation for system $b$ is:

$$dP_{n(b)}=[E_3E_nY_{3n}\sin(\phi_{3n}-\delta_{3n})+E_4E_nY_{4n}\sin(\phi_{4n}-\delta_{4n})]d\delta_n$$

But if all switches are closed and there occur equal negative increments in $\delta_1$ and $\delta_2$, the negative increments in power to bus $n$ from system $a$ is identical with that which would result from an equal positive increment in $\delta_n$ while $\delta_1$ and $\delta_2$ remained fixed; in either case equal to $dP_{n(a)}$ as expressed above. If the total power delivered at $n$ is to remain constant there must be simultaneous equal positive increments in $\delta_3$ and $\delta_4$ such that $d\delta_3=d\delta_4=-Kd\delta_1-Kd\delta_2$; K being that value necessary to $dP_n=0$. Again, the increment in power delivered at $n$ due to a positive increment in $\delta_3$ and $\delta_4$ is identical with that which result from an equal negative increment in $\delta_n$. Accordingly, for $dP_n=0$ the value of $d\delta_n$ in the expression for $dP_{n(a)}$ is $d\delta_n$; and in the expression for $dP_{n(b)}$ it is $-Kd\delta_n$. Then:

$$dP_{n(b)}=[E_3E_nY_{3n}\sin(\phi_{3n}-\delta_{3n})+E_4E_nY_{4n}\sin(\phi_{4n}-\delta_{4n})](-Kd\delta_n)$$

To hold the net load at $n$ fixed, $dP_{n(a)}+dP_{n(b)}=0$, or $dP_{n(a)}=-dP_{n(b)}$ $$E_1E_nY_{1n}\sin(\phi_{1n}-\delta_{1n})+E_2E_nY_{2n}\sin(\phi_{2n}-\delta_{2n})=K[E_3E_nY_{3n}\sin(\phi_{3n}-\delta_{3n})+E_4E_nY_{4n}\sin(\phi_{4n}-\delta_{4n})]$$

or $$K=\frac{E_1E_nY_{1n}\sin(\phi_{1n}-\delta_{1n})+E_2E_nY_{2n}\sin(\phi_{2n}-\delta_{2n})}{E_3E_nY_{3n}\sin(\phi_{3n}-\delta_{3n})+E_4E_nY_{4n}\sin(\phi_{4n}-\delta_{4n})}$$

$$\frac{dC}{d\delta_n}=F_1'\left[\frac{\partial P_1}{\partial\delta_n}\right]+F_2'\left[\frac{\partial P_2}{\partial\delta_n}\right]+F_3'\left[-K\frac{\partial P_3}{\partial\delta_n}\right]+F_4'\left[-K\frac{\partial P_4}{\partial\delta_4}\right]=F_1'[E_1E_nY_{1n}\sin(\phi_{1n}+\delta_{1n})]+F_2'[E_2E_nY_{2n}\sin(\phi_{2n}+\delta_{2n})]$$
$$-\frac{E_1E_nY_{1n}\sin(\phi_{1n}-\delta_{1n})+E_2E_nY_{2n}\sin(\phi_{2n}-\delta_{2n})}{E_3E_nY_{3n}\sin(\phi_{3n}-\delta_{3n})+E_4E_nY_{4n}\sin(\phi_{4n}-\delta_{4n})}[F_3'[E_3E_nY_{3n}\sin(\phi_{3n}+\delta_{3n})]+F_4'[E_4E_nY_{4n}\sin(\phi_{4n}+\delta_{4n})]]$$

$$\frac{dC}{d\delta_n}$$

is the increment in total fuel cost incident to a transfer of power from system $a$ to system $b$ under the conditions $d\delta_1=d\delta_2$ and $d\delta_3=d\delta_4$ and the further condition $dP_n=0$, and where the meaning of $d\delta_n$ is defined as above. A necessary, although not sufficient, condition that fuel cost be a minimum for the entire system ($a$ and $b$ combined) is that this quantity be zero.

Or, at minimum total fuel cost:

$$\frac{F_1^1[E_1E_nY_{1n}\sin(\phi_{1n}+\delta_{1n})]+F_2^1[E_2E_nY_{2n}\sin(\phi_{2n}+\delta_{2n})]}{E_1E_nY_{1n}\sin(\phi_{1n}-\delta_{1n})+E_2E_nY_{2n}\sin(\phi_{2n}-\delta_{2n})}=\frac{F_3^1[E_3E_nY_{3n}\sin(\phi_{3n}+\delta_{3n})]+F_4^1[E_4E_nY_{4n}\sin(\phi_{4n}+\delta_{4n})]}{E_3E_nY_{3n}\sin(\phi_{3n}-\delta_{3n})+E_4E_nY_{4n}\sin(\phi_{4n}-\delta_{4n})}$$

Returning to the case of system $a$ alone (switches $b$—$b$ being open), note that the incremental cost of power delivered at bus $n$ is;

$$\left.\frac{\frac{dC_n}{d\delta_n}}{\frac{dP_n}{d\delta_n}}\right|_a=\frac{F_1^1[E_1E_nY_{1n}\sin(\phi_{1n}+\delta_{1n})]+F_2^1[E_2E_nY_{2n}\sin(\phi_{2n}+\delta_{2n})]}{E_1E_nY_{1n}\sin(\phi_{3n}-\delta_{3n})+E_2E_nY_{2n}\sin(\phi_{2n}+\delta_{2n})}=C_a$$

and for the case of system $b$ (switches $a$—$a$ being open), the incremental cost of delivered power at bus $n$ is;

$$\left.\frac{\frac{dC_n}{d\delta_n}}{\frac{dP_n}{d\delta_n}}\right|_b=\frac{F_3^1[E_3E_nY_{3n}\sin(\phi_{3n}+\delta_{3n})]+F_4^1[E_4E_nY_{4n}\sin(\phi_{4n}+\delta_{4n})]}{E_3E_nY_{3n}\sin(\phi_{3n}-\delta_{3n})+E_4E_nY_{4n}\sin(\phi_{4n}-\delta_{4n})}=C_b$$

Note that when increment in total fuel cost incident to transfer of load between the two interconnected systema is zero, $C_a=C_b$. The conditions for minimum total fuel cost are therefore that the discriminants for Sources 1, 2, 3 and 4 be individually equal to zero and that $C_a=C_b$.

It thus follows that installation of two separate sets of equipment, one indicating the values of the source discriminants for system $a$ plus indication of incremental cost at the interconnection point; and the second providing indications of the discriminants for system $b$ plus the incremental cost at the interconnection point; will provide all the data necessary to allocate loads in both systems for minimum fuel cost. This may be important under either of two circumstances, namely;

If the two halves of the composite system are operated by different companies and the amount and direction of power interchange is limited by conditions, other minimum total fuel cost for the entire system, which may be imposed by the interchange agreement. Or, if there are a large number of sources supplying each half of the system, it may require substantially less investment to provide two instrument assemblies each adequate for the source busses in half of the system, plus bus $n$; rather than a single assembly adequate for all sources busses.

It is, of course, always possible to disregard bus $n$ and to treat the complete system as the four source problem, which it is.

The development of the mathematical relations to this point has been based on the assumption previously stated that each load is represented by a constant impedance while the phase position of the vector voltage at one selected source is advanced incrementally. The necessity for and the consequences of this assumption have been examined in the preceding. The conclusions there drawn apply to a synchronous condenser operated at substantially constant reactive kva. output. However, in many instances, the benefits arising from a synchronous condenser installation are not fully realized unless controls are provided to cause the condenser to maintain substantially constant terminal voltage, supplying whatever amount of reactive kva. may be necessary to accomplish this. Under such conditions the assumption that the condenser may be adequately represented by a constant impedance during the incremental advance of one vector source voltage, is no longer tenable. Accordingly, the following analysis of synchronous condenser operation at constant terminal voltage is included as a basis for the later disclosure of structure whereby the effect of a synchronous condenser operated by controls maintaining constant terminal voltage may be accurately incorporated with the load allocation indicating structure which is described in this application.

Consider, now a three source system with a fourth bus, bus 4, supplied only by a synchronous condenser; Then, $$P_4=E_4^2\cos\phi_{44}-E_1E_4Y_{14}\cos(\phi_{14}-\delta_{14})-E_2E_4Y_{24}\cos(\phi_{24}-\delta_{24}=E_3E_4Y_{34}\cos(\phi_{34}-\delta_{34})$$

$$dP_4=\frac{\partial P_4}{\partial\delta_1}d\delta_1+\frac{\partial P_4}{\partial\delta_2}d\delta_2+\frac{\partial P_4}{\partial\delta_3}d\delta_3+\frac{\partial P_4}{\partial\delta_4}d\delta_4=0 \text{ as there is source at 4}$$

Let $d\delta_2=d\delta_3=0$ and vary $\delta_1$:

$$dP_4=\frac{\partial P_4}{\partial \delta_1}d\delta_1+\frac{\partial P_4}{\partial \delta_5}d\delta_4=0 \text{ and } \frac{d\delta_4}{d\delta_1}=-\frac{\frac{\partial P_4}{\partial \delta_1}}{\frac{\partial P_4}{\partial \delta_4}}$$

or any shift in $\delta_1$, is accompanied by a shift in $\delta_4$, which in turn causes a transfer of power between bus 4 and buses 2 and 3. Then for example:

$$\frac{dC}{d\delta_1}=F_1{}^1\left[\frac{\partial P_1}{\partial \delta_1}+\frac{\partial P_1}{\partial \delta_4}\frac{\partial \delta_4}{\partial \delta_1}\right]+F_2{}^1\left[\frac{\partial P_2}{\partial \delta_1}+\frac{\partial P_2}{\partial \delta_4}\frac{\partial \delta_4}{\partial \delta_1}\right]+F_3{}^1\left[\frac{\partial P_3}{\partial \delta_1}+\frac{\partial P_3}{\partial \delta_4}\frac{\partial \delta_4}{\partial \delta_1}\right]$$

and the discriminant for Source 1 is $$\frac{\frac{dC}{d\delta_1}}{\frac{dP_1}{d\delta_1}}=\frac{F_1{}^1\left[\frac{\partial P_1}{\partial \delta_1}+\frac{\partial P_1}{\partial \delta_4}\frac{\partial \delta_4}{\partial \delta_2}\right]+F_2{}^1\left[\frac{\partial P_2}{\partial \delta_1}+\frac{\partial P_2}{\partial \delta_4}\frac{\partial \delta_4}{\partial \delta_1}\right]+F_3{}^1\left[\frac{\partial P_3}{\partial \delta_1}+\frac{\partial P_3}{\partial \delta_1}\frac{\partial \delta_4}{\partial \delta_1}\right]}{\frac{\partial P_1}{\partial \delta_1}+\frac{\partial P_1}{\partial \delta_4}\frac{\partial P_4}{\partial \delta_1}}$$

where $$\frac{\partial \delta_4}{\partial \delta_1}=-\frac{\frac{\partial P_4}{\partial \delta_1}}{\frac{\partial P_4}{\partial \delta_4}}$$

Similarly it can be shown;

$$\frac{\frac{dC}{d\delta_2}}{\frac{dP_2}{d\delta_2}}=\frac{F_1{}^1\left[\frac{\partial P_1}{\partial \delta_2}+\frac{\partial P_1}{\partial \delta_4}\frac{\partial \delta_4}{\partial \delta_2}\right]+F_2{}^1\left[\frac{\partial P_2}{\partial \delta_2}+\frac{\partial P_2}{\partial \delta_4}\frac{\partial \delta_4}{\partial \delta_2}\right]+F_3{}^1\left[\frac{\partial P_3}{\partial \delta_2}+\frac{\partial P_3}{\partial \delta_4}\frac{\partial \delta_4}{\partial \delta_2}\right]}{\frac{\partial P_2}{\partial \delta_2}+\frac{\partial P_2}{\partial \delta_2}\frac{\partial \delta_4}{\partial \delta_2}}$$

where $$\frac{\partial \delta_4}{\partial \delta_2}=-\frac{\frac{\partial P_4}{\partial \delta_2}}{\frac{\partial P_4}{\partial \delta_4}}$$

and;

$$\frac{\frac{dC}{d\delta_3}}{\frac{dP_3}{d\delta_3}}=\frac{F_1{}^1\left[\frac{\partial P_1}{\partial \delta_3}+\frac{\partial P_1}{\partial \delta_4}\frac{\partial \delta_4}{\partial \delta_3}\right]+F_2{}^1\left[\frac{\partial P_2}{\partial \delta_3}+\frac{\partial P_2}{\partial \delta_4}\frac{\partial \delta_4}{\partial \delta_3}\right]+F_3{}^1\left[\frac{\partial P_3}{\partial \delta_3}+\frac{\partial P_3}{\partial \delta_4}\frac{\partial \delta_4}{\partial \delta_3}\right]}{\frac{\partial P_3}{\partial \delta_3}+\frac{\partial P_3}{\partial \delta_4}\frac{\partial \delta_4}{\partial \delta_3}}$$

where $$\frac{\partial \delta_4}{\partial \delta_3}=-\frac{\frac{\partial P_4}{\partial \delta_3}}{\frac{\partial P_4}{\partial \delta_4}}$$

the three discriminants for the three sources when a fourth bus with synchronous condenser is present.

Compare the first of these discriminants with the discriminant previously developed, for a source system without a synchronous condenser, which is:

$$\frac{\frac{dC}{d\delta_1}}{\frac{dP_1}{d\delta_1}}=\frac{F_1{}^1\left[\frac{\partial P_1}{\partial \delta_1}\right]+F_2{}^1\left[\frac{\partial P_2}{\partial \delta_1}\right]+F_3{}^1\left[\frac{\partial P_3}{\partial \delta_1}\right]}{\frac{\partial P_1}{\partial \delta_1}}$$

and note that to the coefficient of each $F'_n$ term there has been added a term of the form $$\frac{\partial P_n}{\partial \delta_4}\frac{\partial \delta_4}{\partial \delta_1}$$

when the synchronous condenser is added, a similar term also being added to the denominator. Since $$\frac{\partial \delta_4}{\partial \delta_1}=-\frac{\frac{\partial P_4}{\partial \delta_1}}{\frac{\partial P_4}{\partial \delta_4}}$$

it is now necessary to provide instrument structure to measure both numerator and denominator of that quantity, divide the one by the other, multiply the quotient, respectively by $$\frac{\partial P_1}{\partial \delta_4},\ \frac{\partial P_2}{\partial \delta_4},\ \text{and}\ \frac{\partial P_3}{\partial \delta_4}$$

and $F'_1$, $F'_2$, and $F'_3$ in the simple three source expression.

Recall that $$\frac{\partial P_4}{\partial \delta_1}=-E_1E_4Y_{14}\sin(\phi_{14}-\delta_{14})$$

and $$\frac{\partial P_4}{\partial \delta_4}=E_1E_4Y_{14}\sin(\phi_{14}-\delta_{14})+E_2E_4Y_{24}\sin(\phi_{24}-\delta_{14})+E_3E_4Y_{34}\sin(\phi_{34}-\delta_{34})$$

Obviously when $Y_{14}=0$, the added term in the coefficient of $F'_1$ vanishes. This may occur in many cases in an actual system. However, usually, at least two of the $$\frac{\partial P_n}{\partial \delta_4}$$

terms will not vanish. To avoid simplification which may not be always justified, the following treatment is based on the premise that none of the $$\frac{\partial P_n}{\partial \delta_4}$$

terms vanish. If any do, the consequent simplification in necessary structure will be apparent.

For the discriminant $D_1$:

The added term in the coefficient of $F'_1$ is:

$$-\frac{E_1E_4Y_{14}\sin(\phi_{14}+\delta_{14})-E_1E_4Y_{14}\sin(\phi_{14}-\delta_{14})}{E_1E_4Y_{14}\sin(\phi_{14}-\delta_{14})+E_2E_4Y_{24}\sin(\phi_{24}-\delta_{24})+E_3E_4Y_{34}\sin(\phi_{34}-\delta_{34})}$$

which is also the added term in the denominator.

The added term in the coefficient of $F'_2$ is:

$$-\frac{E_1E_4Y_{24}\sin(\phi_{24}+\delta_{24})\cdot E_1E_4Y_{14}\sin(\phi_{14}-\delta_{14})}{E_1E_4Y_{14}\sin(\phi_{14}-\delta_{14})+E_2E_4Y_{24}\sin(\phi_{24}-\delta_{24})+E_3E_4Y_{34}\sin(\phi_{34}-\delta_{34})}$$

The added term in the coefficient of $F'_3$ is:

$$-\frac{E_3E_4Y_{34}\sin(\phi_{34}+\delta_{34})-E_1E_4Y_{14}\sin(\phi_{14}-\delta_{14})}{E_1E_4Y_{14}\sin(\phi_{14}-\delta_{14})+E_2E_4Y_{24}\sin(\phi_{24}-\delta_{24})+E_3E_4Y_{34}\sin(\phi_{34}-\delta_{34})}$$

For the discriminant $D_2$, the added term in the coefficient of $F'_1$ is:

$$-\frac{E_1E_4Y_{14}\sin(\phi_{14}+\delta_{14})-E_2E_4Y_{24}\sin(\phi_{24}-\delta_{24})}{E_1E_4Y_{14}\sin(\phi_{14}-\delta_{14})+E_2E_4Y_{24}\sin(\phi_{24}-\delta_{24})+E_3E_4Y_{34}\sin(\phi_{34}-\delta_{34})}$$

The added term in the coefficient of $F'_2$ is:

$$-\frac{E_2E_4Y_{24}\sin(\phi_{24}+\delta_{24})-E_2E_4Y_{24}\sin(\phi_{24}-\delta_{24})}{E_1E_4Y_{14}\sin(\phi_{14}-\delta_{14})+E_2E_4Y_{24}\sin(\phi_{24}-\delta_{24})+E_3E_4Y_{34}\sin(\phi_{34}-\delta_{34})}$$

which is also the added term in the denominator.

The added term in the coefficient of $F'_3$ is:

$$-\frac{E_3E_4Y_{34}\sin(\phi_{34}+\delta_{34})-E_2E_4Y_{24}\sin(\phi_{24}-\delta_{24})}{E_1E_4Y_{14}\sin(\phi_{14}-\delta_{14})+E_2E_4Y_{24}\sin(\phi_{24}-\delta_{24})+E_3E_4Y_{34}\sin(\phi_{34}-\delta_{34})}$$

For the discriminant $D_3$, the added terms are the same as for the $D_1$ case except that in each numerator the term $[E_1E_4Y_{14}\sin(\phi_{14}-\delta_{14})]$ is replaced by the term $[E_3E_4Y_{34}\sin(\phi_{34}-\delta_{34})]$ and the added term in the coefficient of $F'_3$ becomes the added term in the denominator.

These operations require additional structure disclosed in schematic form in FIGURE 7(F), and modification of the switching structure from that of FIGURE 5(C) to that of FIGURE 8(C'). These additions and modifications are described in detail in the specification which follows.

All of the preceding has been based on three, or at most four, sources supplying the system to avoid unnecessary terms and inconveniently long equations. No difficulty will be encountered in extending these expressions to any number of sources, although it will be understood that the necessary structure increases in complexity quite rapidly as the number of sources grows.

The system transfer admittances appear repeatedly in the expression for incremental cost which have been developed. It is a well known fact that transfer admittance can be directly measured for any specific condition of system load when that specific load condition is duplicated in a network analyzer study. However, a question arises with regard to the propriety of employing transfer admittance data measured under the specific load conditions when another load condition actually exists. This question is examined in the following:

Reference is made to FIGURES 10 and 11, which will be hereinafter described in short form and also, if need be, in further detail:

Consider the two sources 1 and 2 of FIGURE 10, which are connected by a tie comprising two series connected sections of impedances $a$ and $b$, respectively, and which supply three loads of impedances $c$, $d$ and $e$, respectively, disposed as shown in the figure. All the impedance quantities are complex independent variables. It can be demonstrated, (see any text on circuit analysis), that, insofar as can be determined through any measurement which can be made at terminals 1 and 2 (FIGURE 11) is exactly equivalent to FIGURE 10, provided the complex admittances of FIGURE 11 are:

$$\dot{Y}_{11}=\frac{ab+bc+ca+cd+bd}{(ab+bc+ca)d}=\text{driving point admittance at terminal 1}$$

$$\dot{Y}_{22}=\frac{ab+bc+ca+de+ce}{(ab+bc+ca)e}=\text{driving point admittance at terminal 2}$$

$$\dot{Y}_{12}=\frac{c}{ab+bc+ca}=\text{transfer admittance between 1 and 2}$$

It will be noted that $Y_{12}$ is independent of the load impedances $d$ and $e$. It is a function of the line constants $a$ and $b$, and of the impedance of the load $c$ tapped at the junction of $a$ and $b$. If all loads varied at all times in the same ratio, all transfer admittances would tend to vary simultaneously, and in the same direction, but not necessarily at the same rate. Thus there is a tendency for the variations in transfer admittance with load to cancel out of the expressions for the discriminants, and in some systems the residual error is of little significance. However, this is not true in general and further examination is in order.

It can be shown that for any line of fixed total impedance ($a$ plus $b$ being equal to a constant), the derivative $$\frac{dY_{11}}{dc}$$

is a maximum when $a$ equals $b$. This states that the rate of change of $Y_{12}$ with respect to $c$ is greatest when the load impedance $c$ is at the center of the line 1–2. As $a$ equals $b$ constitutes the worst condition, it is this condition which will be examined further, as follows:

When $a$ equals $b$, $$Y_{12}=\frac{1}{a+b+\frac{ab}{c}}=\frac{1}{a\left(2+\frac{a}{c}\right)}$$

Further, if there is no load at the tap, $c$ equals infinity and $$Y_{12}=Y_{120}=\frac{1}{2a}$$

Then $$\frac{Y_{12}}{Y_{120}}=\frac{2}{2+\frac{a}{c}}$$

both $a$ and $c$ being complex, that is $a=a\angle\alpha$ and $c=c\angle\gamma$.

Practical considerations of voltage regulation and transmission loss limit the magnitude of the ratio $a/c$. While higher values are occasionally encountered in distribution circuits serving lightly loaded areas, $a/c$ in a bulk power system, such as considered here, will rarely be as great as 0.50 and, almost always, is substantially lower.

For usual transmission circuit construction, the line impedance angle, $\alpha$, will range from about 65 degrees upward. The load impedance angle, $\gamma$, is related to the load power factor; it is 25.8 degrees at 90% power factor. A reasonably typical value for $\alpha-\gamma$ would be 70 degrees minus 25 degrees, or 45 degrees.

The following table is computed on the basis that $a$ is constant while the load is increased from zero to a practicable maximum, at constant power factor, by reducing the impedance $c$, with 100% voltage maintained at the load. The first column is the line impedance (constant in ohms) expressed in per unit on the kva. base of the load $c$. The angle $\alpha-\gamma$ is 45 degrees throughout. The final column is an approximate measure of $$Y_{mn}\sin(\phi_{mn}-\delta_{mn})$$

at the existing load, divided by the same quantity at no load, when $\delta_{mn}$ is small.

TABLE I

| $a$ in per unit on base $1/c$ | $\frac{a}{c}\underline{/45}$ | $2+\frac{a}{c}\underline{/45}$ | $\frac{\dot{Y}_{12}}{\dot{Y}_{120}}$ | $\frac{Y_{12}\sin\phi_{12}}{Y_{120}\sin\phi_{120}}$ |
|---|---|---|---|---|
| 0.00 | $.000+j.000$ | $2.00\underline{/0.0}$ | $1.000\underline{/\ 0.0}$ | 1.000 |
| 0.01 | $.007+j.007$ | $2.01\underline{/0.2}$ | $0.995\underline{/-0.2}$ | .994 |
| 0.05 | $.035+j.035$ | $2.04\underline{/1.0}$ | $0.980\underline{/-1.0}$ | .972 |
| 0.10 | $.071+j.071$ | $2.07\underline{/2.0}$ | $0.967\underline{/-2.0}$ | .950 |
| 0.25 | $.177+j.177$ | $2.18\underline{/4.7}$ | $0.918\underline{/-4.7}$ | .882 |
| 0.50 | $.354+j.354$ | $2.34\underline{/8.6}$ | $0.837\underline{/-8.6}$ | .779 |

If the load (load impedance $c$) is of such a magnitude that the line impedance to one terminal is 10% on the load base under peak load conditions, and the load drops to half that magnitude at light load, the variation in the quantity $Y_{mn}\sin(\phi_{mn}-\delta_{mn})$ is seen from the Table I, to be plus or minus 1% from the mean value. This variation is actually less than the probable error in measuring $Y_{mn}$ at mean load on a network analyzer and may, properly, be ignored.

In the extreme condition in which peak load corresponds to the last line in said table, and light load to the line next above such last line, the variation in $$Y_{mn}\sin(\phi_{mn}-\delta_{mn})$$

from the mean load value will be close to plus or minus 6.3% and, in many cases, should not be ignored. Fortunately, provision is readily made in the proposed structure, to compensate for those variations in transfer admittance, if any, which could have a significant effect on the accuracy of the indications.

In the structure to be disclosed, the transfer admittances are represented by groups of impedances which are adjusted to complex values specifically related to these admittances at the time of installation. If one or more transfer admittances vary with load by a margin sufficient to require compensation, it is only necessary to make the corresponding adjustment in each of the structure impedances associated with them. Such adjustments need not be continuous. If the probable error in determining a transfer admittance under a stated load condition is plus or minus 2%, a range of variation with load of the same magnitude would be properly accepted before any adjustment was considered necessary. When the variation exceeded plus or minus 2%, a second set of impedances differing from the first set by 4% could be substituted, as by a relay operation.

For example, in the extreme case previously mentioned, provision of three groups of fixed impedances with suitable switching so that the appropriate group is always inserted in the corresponding element of the structure, would reduce the error in the $Y_{mn}\sin(\phi_{mn}-\delta_{mn})$ term to a maximum of plus or minus 2% instead of the plus or minus 6.3% previously mentioned.

The groups of impedances requiring switching are those associated with transfer admittances which are expected to vary with load by more than the plus or minus 2% probable error in the initial mean load setting. They are, in each such group, the four impedances shown in FIGURE 3(B), hereinafter to be described.

There is no difficult problem associated with operating a relay to remove four impedances from a circuit and substitute four other impedances. Any reasonably skilled technician should be able to provide the necessary relay and circuitry if advised of the condition or circumstance which is to initiate the relay operation. Most simply this would be in response to change in the particular load or loads of which a particular transfer admittance is a function. Knowledge of such load change could, if sufficiently important, be transmitted to the affected relay by telemeter, or with manual intervention, by telephone, or teletype.

More practically the variation of such a particular load would be coordinated with time of day or with total system load, either of which quantities is available at the dispatcher's office continuously. If a load which causes a significant variation in a transfer admittance is found to vary substantially as the total system load varies, a relay responsive to total system load is caused to change the four structure impedances corresponding to that transfer admittance whenever the system load increases above a predetermined value, and to change them back again when the total system load falls below that value. If the load in question is "nonconforming" (does not vary substantially as the total system load varies) but does vary in a reasonably constant time cycle, no matter how complex, a timer with adjustable code wheel can initiate the relay operation. There are few loads which do not, to a satisfactory degree of correlation, vary either with total system load or with time. If one is encountered, and it does affect the value of a transfer admittance significantly, it may be necessary to provide manual switching of the affected impedance group although such instances are not anticipated normally.

When system switching operations alter any one, or any group of transfer admittances for a period of material duration, it is desirable that the corresponding groups of impedances in the instrument structure be altered to conform to the new condition. Since such switching is always immediately known to the load dispatcher, the substituting of a new group of impedances is properly manually accomplished by the dispatcher. Conveniently, all affected impedance groups which are varied as a consequence of one switching operation would be varied simultaneously through suitable relays responsive to a single manual operation.

The provision of relay equipment to substitute one group of impedances for another in the instrument structure, whether in response to a time schedule, to variations in total system load, to manual initiation, or to any combination of these, can be readily devised by anyone skilled in the art who is conversant with the theory and structure of the present disclosures. In view of this fact, and the further fact that, except to conform to switching operations on the actual power system, comparatively few, if any, transfer admittances will be found to vary sufficiently to require compensation, no attempt is made in the following disclosures of structure to include those minor detail features which would be needed for that purpose.

It is desirable that some comment be made relative to one source of inherent error in the instrument indications which error may appear to be of possibly serious magnitude until fully analyzed. It is well known that in an expression of the form $x$ equals $a$ minus $b$, where $a$ and $b$ are each very much larger than $x$, a very small percentage error in either $a$ or $b$ may result in a very large percentage error in $x$. The numerator of the expression for the discriminant $D_1$ is $$F'_1[E_1E_2Y_{12}\sin(\phi_{12}+\delta_{12})+E_1E_3Y_{13}\sin(\phi_{13}+\delta_{13})]$$
$$-F'_2[E_1E_2Y_{12}\sin(\phi_{12}-\delta_{12})]$$
$$-F'_3[E_1E_3Y_{13}\sin(\phi_{13}-\delta_{13})]$$

and is developed in the structure as a voltage $E_{output}$ eequals $V_1$ plus $V_2$ plus $V_3$ in FIGURE 4(D), where one or more of the V terms are negative. This expression is one of the form mentioned and, in general is subject to the objection mentioned. However, the discriminant $D_1$ is adjusted to $D_1$ equals zero in bringing the load allocation to correspond to minimum fuel cost; that is, to $E_{output}$ equals 0 in FIGURE 4(D). This adjustment is accomplished when the sum of the positive V terms is equal to the sum of the negative V terms—for example, when $V_1$ equals $V_2$ plus $V_3$. Then the percentage error in the term on either side of the equality sign cannot exceed the percentage error in the single V term having the greatest percentage error. In effect, the use of the D values as null indications eliminates the otherwise possibly serious error inherent in equations of this form.

In the expression for incremental cost of delivered power, which for a load at bus 3 is $$\frac{dC_3}{dP_3}=\frac{F_1'[E_1E_3Y_{13}\sin(\phi_{13}+\delta_{13})]+F_2'[E_2E_3Y_{23}\sin(\phi_{23}+\delta_{23})]}{E_1E_3Y_{13}\sin(\phi_{13}-\delta_{13})+E_2E_3Y_{23}\sin(\phi_{23}-\delta_{23})}$$

all terms in both numerator and denominator are of the same sign and the possible source of error mentioned above is not present.

Having thus disclosed at some length, and in some detail the underlying principles and mathematical analyses on which my presently to be disclosed equipment operates, and which enter into the functioning of such equipment for the production of the desired end results, I next refer in general terms to the *Input Data required in the operation of the embodiment herein disclosed in detail, as follows.*

A. Data required at time of installation of the present equipment:

(*a*) *Generating Station Incremental Cost Data.*—In current practice station incremental cost data is derived from station power output by application of a simple formula of form $F'_n$ equals $a_n$ plus $b_nP_n$. Here the constants $a_n$ and $b_n$ are derived from station data relating electrical output in megawatts to thermal input in B.t.u. per hour, multiplied by fuel costs in cents per B.t.u. The constants are revised when this cost of fuel changes. Further, both the $a$ and $b$ terms will vary when the identity of the several individual machines, boilers, etc., in actual use is changed, and further variations occur when, in response to output demand, the number of active nozzles of the turbines is changed by the governors. Techniques are well known, and some have been disclosed in the literature and the patented art, through which a direct current voltage is developed which is proportional to incremental cost at the source bus, being the $F'_n$ of the preceding mathematical development, but one form of structure which presents such data in a particularly convenient form is shown in FIGURE 2 (A).

(*b*) *Transfer Admittance Values,* $\dot{Y}_{mn}$, and their conjugates, $\hat{Y}_{mn}$, are set into the instrument at the time of installation. They are determined by direct measurement during a network analyzer study. In a typical system some of the transfer admittance terms are zero, and are simply omitted; others are fixed values subject to no variations unless the system is modified by new constructions. Still others will change slightly in both magnitude and angle as certain loads, supplied through taps between station busses, vary. As discussed in another paragraph, this variation is, most often, not significant; particularly if the transfer admittances are metered at some intermediate load chosen to limit the variation of the actual from the selected value to a minimum. In the rather rare instances in which the variation exceeds acceptable limits, two or more values may be provided in the instrument structure, with switching facilities, manually or automatically operated, to select the appropriate one.

B. Input Continuously Supplied:

(*a*) *The power output of each source.*—It is present operating practice to provide this information to load dispatchers continuously, and methods for so doing are well known together with methods of totalizing these outputs to indicate total system load.

(*b*) *Voltages at all source busses,* $\dot{E}_n$, in both magnitude and phase. Transmission of voltage magnitude to the dispatchers office is not usual practice as source busses are, normally, either operated at a fixed voltage or are adjusted over a definite range in accordance with a schedule based either on time or on station output, under which conditions voltage magnitudes are known. If bus voltages are allowed to vary in a random manner, voltage magnitudes would have to be transmitted to the dispatcher's office, and several methods for such transmission are well known. Transmission of phase position is also well known, one method being that described by Pierce and Hamilton, AIEE paper No. 38–118. A simple method for accomplishing both over reasonable distances is metallic line transmission of a single phase voltage derived from the bus through a potential transformer of instrument accuracy, and could be accomplished over the usual communication circuits. This, of course, is possible without significant error only because the impedance of the instrument circuits at the receiving end are both known and constant. If the distances are so great that some phase shift is introduced, due to the finite velocity of propagation, it can easily be corrected by a simple static phase shift circuit at the receiver end. Alternately, either carrier or microwave are available transmission media although some additional gain stabilization circuitry might be desirable.

In the drawings:

FIGURE 1 shows in schematic block diagram form one embodiment of equipment capable of producing operations and the end results and objectives already referred to, and according to the principles already exposed; and in this figure there is shown provision for thus studying and procuring the desired information for the case of a three-power-source system;

FIGURE 2 shows a schematic circuitry for one of the "A" units of FIGURE 1, which units receive information from the several power sources and deliver corresponding D.C. voltages proportional to the reciprocal of the incremental cost of the power being supplied by the several power sources;

Figure 6:
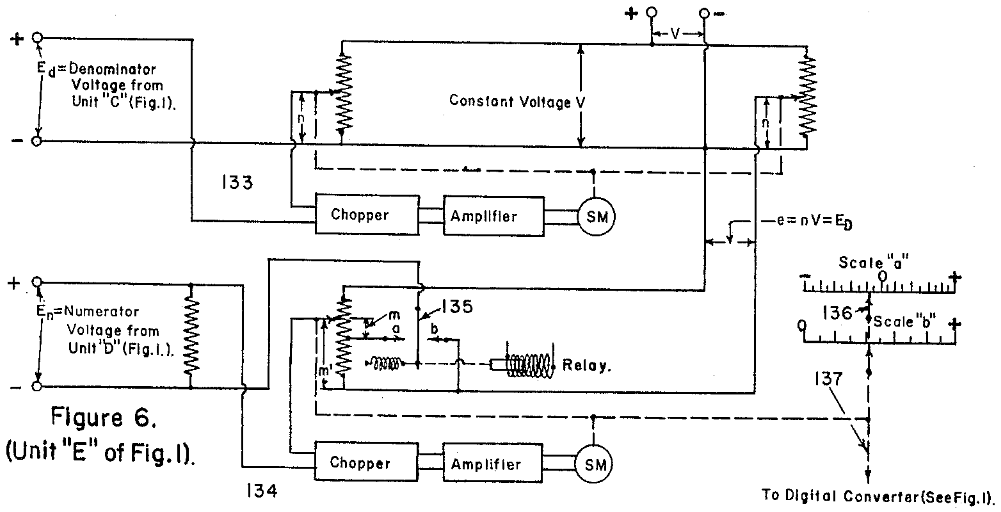

FIGURE 3 shows a schematic circuitry for one of the "B" units of FIGURE 1, which units include power measuring units (e.g. thermoverters) for delivering D.C. voltages of magnitude proportional to powers measured by such units; and also include circuitry, which under proper switching control, deliver corresponding to each power source under test, voltage values corresponding to terms of the denominators of the discriminants whose values are to be displayed and used in determining re-allocations of power supplied to the system by such power sources;

FIGURE 4 shows a schematic circuitry for one of the "D" units of FIGURE 1, which units receive incremental cost information from the "A" units (FIGURE 2) and also receive information from the "B" units (FIGURE 3), and which "D" units include circuitry to process such several so-received data information and deliver voltage values corresponding to terms of the numerators of the discriminants whose values are to be displayed and used in determining re-allocations of power supplied to the system by such sources;

FIGURE 5 shows a schematic circuitry for the unit "C" of FIGURE 1, being a Selecting Means by which the information received from the several units "B" may be coordinated for delivery of proper values to the units "D" and also as values representing the denominators of the several discriminants in a succession of tests, such Selecting Means of unit "C" being progressively advanced by steps through cycles of switching operations, to thus ensure progressive cyclic testing of the various power sources, or to enable manual control of such progressive testing as desired;

FIGURE 6 shows a schematic circuitry for the unit

Figure 7:
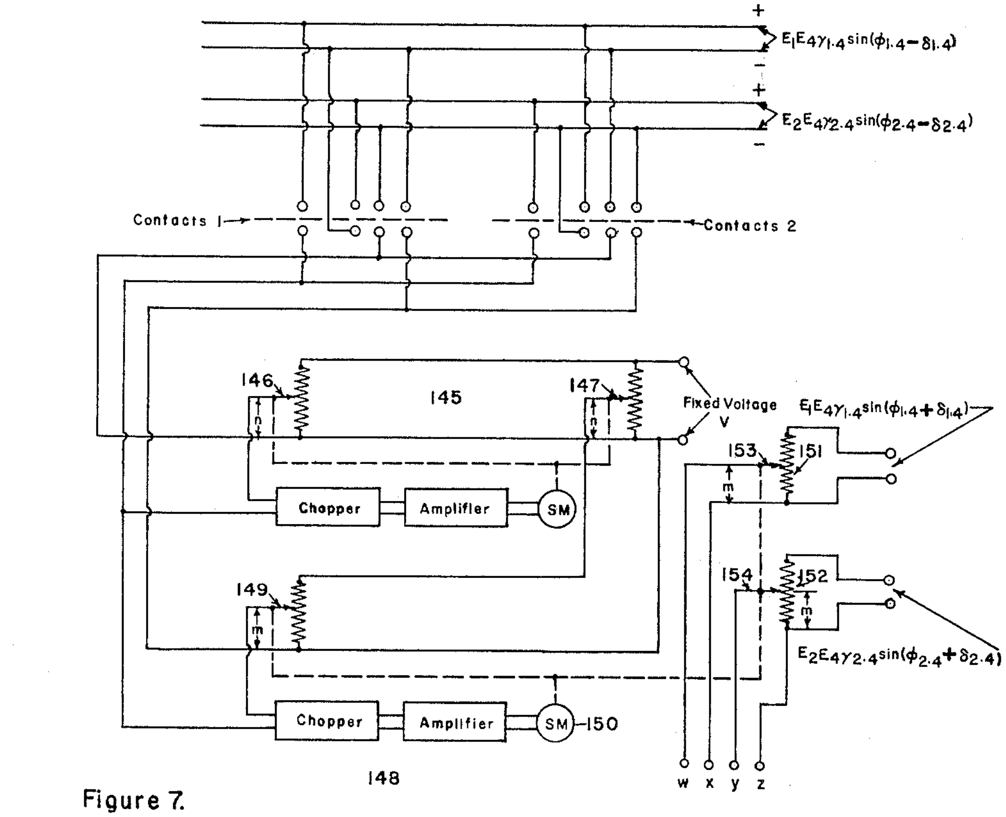

"E" of FIGURE 1, being a dividing means receiving numerator information from the units "D" and denominator information from the unit "C," corresponding to the test data for the several power sources; and this unit "E" of FIGURE 6 processes such so-received information, producing the dividing operations, and delivers values corresponding to the several discriminants for the several power sources under test;

FIGURE 7 shows a schematic circuitry for the unit "F" of FIGURE 1, being a unit which I have provided for use in connection with the showing of FIGURE 1 (A—A), to provide for certain operations required when a synchronous condenser is included in the system;

FIGURE 8 shows a schematic circuitry of a modified form of switching unit to be used in place of the unit shown in FIGURE 5 (C) when the unit of FIGURE 7 (F) is included in the elements for the synchronous condenser arrangement just previously mentioned;

FIGURE 9 is a simple schematic showing of a condition in which two groups of sources, feeding into a common bus may be studied, mathematically, and treated as a simpler system than would be necessary when treated otherwise than according to such showing; and FIGURES 10 and 11 are simple schematic showings of basic circuitry, to which reference has previously been made herein.

Referring first to the block diagram of FIGURE 1, the same shows telemetering channels used to bring signals from the three sources, Nos. 1, 2 and 3, to receivers at the dispatcher's office. The receiver outputs are indicated to be (*a*) A set of three D.C. voltages, each proportional to the power output of one of the three sources, these voltages being delivered over the lines 50, 51 and 52, respectively;

(*b*) A set of three A.C. voltages, each proportional to and in phase with the bus voltage at the corresponding source, these A.C. voltages being delivered over the lines 53, 54 and 55, respectively.

The D.C. voltages proportional to source power outputs are indicated as operating conventional power indicating, recording and totalizing instruments, thus providing indications essential to the power dispatcher, although not actually an element of the Load Allocation Indicator to which this application is directed. The same D.C. voltages are also shown as input data to blocks constituting means for developing and delivering D.C. voltages proportional to the reciprocal of the incremental cost of power at the respective source busses as functions of the power outputs of these sources. These incremental cost data indicating voltages units are shown at 56, 57 and 58, in FIGURE 1. These units 56, 57 and 58 of necessity include provision for manual adjustment to conform to the individual units of generating equipment actually in use at any time, and also to modify the output voltages in proportion to the current cost of fuel at the several source locations. The information necessary to permit these manual adjustments would normally be received by telephone or teletype directly from the source points whenever a change is required. A preferred means for this purpose is disclosed in FIGURE 2, and is described in the following paragraphs, which presume that a D.C. voltage, proportional to the power output of each one of the $n$ sources, is available at the dispatcher's office, in accord with usual current practice.

FIGURE 2 shows a preferred means for developing a D.C. voltage which is a function of the incremental cost of power at Source 1. Similar means are provided for each other source. Each such means includes 4 voltage dividing potentiometers #1, #2, #3, #4 (59, 60, 61, 62) (correspondingly legended in FIGURE 1), of which two are manually adjustable from time to time, the remaining two being subject to continuous adjustment by the self-balancing servo-operated potentiometers, devices which are commercially available and well known in the arts.

The voltage impressed across the potentiometer #1, at the upper left, is designated as equal to $P_n$, the power output as Source 1. This implies that a specific relation has been assumed relating voltage in millivolts to power in megawatts, and this is in accord with present practice when power is measured at one location, converted to some other quantity, transmitted to a second location, and read out as millivolts. In one such instance the chosen relation is 1 millivolt equals 1 megawatt; but any convenient equivalence may be selected so long as it is compatible with other elements of the complete structure. The manually adjusted slider 64 is set to a fraction $b$, of the total potentiometer resistance, so the voltage at the slider 64 is $bP_1$ above the negative terminal. It is, of course understood in this and succeeding instances, that the current flowing in the potentiometer is sufficiently large compared to that flowing in the slider, so that there is no significant error in the statement of the preceding sentence. This is simply a matter of engineering design in the selection of component resistances, etc., based on well known relations which need not be discussed here.

Similarly, the manual adjustment of slider 65 of potentiometer #2 to a fraction $a$ of the total potentiometer resistance leads to a voltage $aE_o$ between the slider and the positive terminal. The sum of the output voltages of potentiometers #1 and #2 is impressed across the potentiometer #4 and is $$E_4 \text{ equals } b_1P_1 \text{ plus } a_1$$

As previously mentioned under "Input data" the incremental cost of power at Source 1 is expressed by the relation $$F'_1(P_1) \text{ equals } F'_1 \text{ equals } a_1 \text{ plus } b_1P_1$$

and it is seen that $F'_1$ and $E_4$ are expressions of the same form. However, as previously stated, both $a_1$ and $b_1$ vary in direct ratio to the cost of fuel at Source 1. But it is more convenient to make an adjustment for fuel cost as a single separate adjustment rather than to adjust the $a$ and $b$ constants separately. Accordingly, there is provided the potentiometer #3, across which is impressed the adjustable voltage $E_c$, continuously indicated in magnitude by the voltmeter shown connected across potentiometer #3. A specific relation is assumed relating the cost of fuel in cents per B.t.u. at Source 1 to reciprocal volts and the voltmeter is calibrated in fuel cost in cents per B.t.u., the scale, of course, being reciprocally related to the magnitude of the voltage $E_c$, then, by manual adjustment it is possible to adjust $E_c$ to the value $$E_c=\frac{1}{\text{cost of fuel in cents/B.t.u. at source 1}}$$

The self-balancing potentiometer, a commercially available device, automatically adjusts the slider 66 on potentiometer #4 until the fraction of the total voltage across potentiometer #4 is identical to the reference voltage $E_5$, or $$nE_4=E_5=n(a_1+b_1P_1)$$

This is accomplished by impressing the difference between $nE_4$ and $E_5$ through the chopper and the amplifier, on the servo-motor in a manner well known in the art. Unless this difference is zero, the motor operates to move the slider of potentiometer #4 to reduce the difference to zero and thus to make the above relation valid. From the preceding $$n=\frac{E_5}{a_1+b_1P_1}=\frac{a \text{ constant}}{a_1+b_1P_1}$$

The same motor also drives the slider of potentiometer #3 so that the fraction $n$ of the total resistance of #3 is also the fraction $n$ of #4. As the voltage $E_c$ across #3 is $$E_c = \frac{1}{\text{cost of fuel at source 1}}$$

the output voltage $E_1$ is $nE_c$, which is $$\frac{a \text{ constant}}{(a_1+b_1+P_1)\text{ (cost of fuel at source 1}}$$

It has been shown that the voltage $E_1$ is the reciprocal of the quantity $F'_1$ when the potentiometers #1 and #2 and the adjustable D.C. voltage $E_c$ are properly adjusted to magnitudes $a_1$, $b_1$, and reciprocal of fuel cost at Source 1, respectively. These adjustments will vary from day to day, and at times, as frequently as from hour to hour, but are constant for periods of reasonable duration. When a generator is connected to the bus at Source 1, both $a$ and $b$ require re-adjustment. When the load $P_1$ increases or decreases to an extent such that some turbine nozzles previously idle, are brought into action, or vice versa, both $a$ and $b$ will require adjustment. When fuel cost at Source 1 changes, $E_c$ will require adjustment. Advice of such conditions is ordinarily, in present operating practice, delivered to the dispatcher by teletype or telephone when it occurs, and the requisite manual adjustments are easily made. This is facilitated by the provision of a separate adjustment for fuel cost as this removes this variable factor from the $a$ and $b$ constants which are then functions of the generator units actually in operation, and of their valve positions, only.

There will be provided $n$ units as shown in FIGURE 2(A) for an $n$ source system. As the block diagram of FIGURE 1 (A—A) is drawn for a three source system, three blocks designated "A" (fig.), are shown.

Three A.C. voltages are designated in the block diagram of FIGURE 1 as $E_1\angle\delta_1$, $E_2\angle\delta_2$, and $E_3\angle\delta_3$, although it will be understood that actually they are merely proportional to those values. As shown, these voltages are impressed by the connections 70, 71 and 72, in pairs on blocks marked "E" (FIGURE 3), FIGURE 1, the outputs of which are indicated as passing to a block designated "Selecting Means," "C"—(FIG. 5), FIGURE 1. The structure of the "B" blocks is shown in schematic form in FIGURE 3(B), together with a portion of the switching means "C" of FIGURE 1. As a full understanding of the operation of this group of elements is essential to an understanding of the complete structure, this discussion is now directed to FIGURE 3(B).

FIGURE 3(B) consists of two portions. The portion which is enclosed within the dashed line and legended "Switched Thermoverters (FIG. 1)," comprises one portion, and, as shown, includes four thermoverters and five sets of switching contacts associated therewith. These thermoverters are numbered 73, 74, 75 and 76, and the switching contacts are numbered 77, 78, 79, 80 and 81. The remaining portion of this figure consists of four impedance elements, 82, 83, 84 and 85, and two pairs of permanently wired terminals, 86 and 87, one such pair at each side of the figure.

For a power system of $n$ sources there are required $(n/2)(n-1)$ elements of the form shown in FIGURE 3; but only $n-1$ are used at any one instant to develop output voltages corresponding to all terms of any one discriminant. Accordingly, only $n-1$ sets of four thermoverters each, are required, and one function of the selecting means "C" is to switch these $n-1$ sets of thermoverters into a selected $n-1$ of the $(n/2)(n-1)$ elements of the form shown in FIGURE 3. A second function of the selecting means "C" is to connect the outputs of these thermoverters in selected manner as hereinafter described.

In the form of element disclosed in FIGURE 3(B), the multiplication means employed is a thermoverter element. However, it will be recognized that fully equivalent results could be obtained through use of any of several alternate elements capable of developing a voltage proportional to the dot product of a voltage vector and a current vector, in place of the thermoverter shown by way of illustration. One such alternative is the so-called "Hall Generator" a disclosure of which is mentioned in paper 90 by Wallace and Gilbreath, and presented at the 1960 American Power Conference, at Chicago, Illinois. Another disclosure is the combination of an electrodynamometer type instrument movement with an opposing d'Arsonval movement, as suggested in Paragraph 3–381 of the Ninth Edition of the Standard Handbook for Electrical Engineers, (Knowlton), McGraw-Hill Book Co., Inc., with suitable modifications. The significant feature of the disclosure of FIGURE 3(B) is the combination of a means for developing a voltage proportional to power, with circuitry in which, through a suitable selection of input voltages and internal impedances, the power, to which the developed voltage is proportional, is caused to be equal or proportional to, a quantity, not necessarily power, but which is desired in the form of a voltage for some subsequent operation.

With the foregoing in mind, in normal usage a thermoverter includes two power measuring elements one of which is inserted in each phase of a three phase circuit to correctly meter three phase power whether the phase currents are balanced or not. In the present application all of measurements involve single phase quantities, and accordingly, each block marked "T" in FIGURE 3 represents a single thermoverter element. In each instance a pair of connections 88, 89, 90 and 91, at the top of each such block "T" represent the path through which current enters and leaves the element; while another pair of connections 92, 93, 94 and 95, at the left side represent connections to the potential circuit. A third pair of terminals 96, 97, 98 and 99, at the bottom of each block are those at which the D.C. output voltage appears. These terminals are also switched as will be subsequently described. Each block representing one thermoverter element, is numbered in the diagram as "$T_1$," "$T_2$," "$T_3$" and "$T_4$," (73, 74, 75 and 76). The contacts marked "$a$," switches 77, 78, 79, 80 and 81, are simultaneously closed when a particular group of thermoverter elements is "switched" into a particular group of impedance elements associated permanently with a particular pair of A.C. voltages. For a power system of $n$ sources there are required $n/2(n$ minus 1) impedance element groups, but only ($n$ minus 1) groups of switched thermoverters. This permits substantial economies by transferring ($n$ minus 1) thermoverter groups to an equal number of appropriately selected groups of impedances, leaving the remaining such groups temporarily idle.

Each individual group of impedances is permanently connected to two of the A.C. voltage, $E_m\angle\delta_m$, $E_n\angle\delta_n$, etc. When there are $n$ sources, and consequently $n$ of those A.C. voltages, there are $n/2(n$ minus 1) combinations of two at a time, and each voltage is paired once with each other such voltage as inputs to one impedance group. In each instances the voltage with the lower subscript is connected at the left-hand terminal pair and that of the higher subscript, at the right-hand terminal pair. Each of these voltages is a voltage to ground and the ground terminals are common throughout all $n/2(n$ minus 1) groups of the type shown in FIGURE 3(B).

Two of the four impedance elements of FIGURE 3 are labelled $Z_{mn}$ and two are labelled $\hat{Z}_{mn}$, indicating in the conventional manner that the impedances of the one pair are the conjugate of those of the other. The double subscript, $mn$, indicates that the impedance carrying that subscript is a function of the transfer admittance in the actual power system between Source $m$ and Source $n$; and further that the voltage applied to the left end of the group is $E_m\angle\delta_n$ as indicated by the first subscript, and that applied at the right-hand end of the group is $E_n\angle\delta_n$ as indicated by the second subscript. The relation between the impedance $\dot{Z}_{mn}$ and the corresponding transfer admittance $\dot{Y}_{mn}$ is given by the equation, $$\dot{Z}_{mn}=\frac{1}{Y_{mn}\underline{/90-\phi_{mn}}}=\frac{1}{Y_{mn}}\underline{/\phi_{mn}-90}$$

and the conjugate is, $$\hat{Z}_{mn}=\frac{1}{Y_{mn}\underline{/\phi_{mn}-90}}=\frac{1}{Y_{mn}}\underline{/90-\phi_{mn}}$$

All of the transfer admittances are measured during a network analyzer study of the complete power system. Normally such studies are made in arbitrary "per unit" quantities, rather than in volts, amperes, and ohms. The measured per unit admittances are converted to complex impedances, also in "per unit," and then to complex ohms using any convenient scale ratio. The impedances shown in FIGURE 3(B) are, actually, an adjustable resistance and an adjustable capacitive reactance in series, or an adjustable resistance and an adjustable inductive reactance in series for those which are conjugate quantities. These adjustable components are set to the proper values, as determined from the network analyzer study, at the time of installation and require no further attention until the power system itself is changed. For an $n$ source system there are $n/2(n$ minus 1) groups of four impedances per group as shown in FIGURE 3(B), or $2n(n$ minus 1) impedances in all. Half of these, namely, ($n$ minus 1) of them, will include resistance and inductive reactance, and an equal number will include resistance and capacitive reactance.

As is well known, a thermoverter develops a D.C. voltage proportional to the power in the A.C. circuit in which it is connected. If the applied A.C. voltage is $e$ and the A.C. current is $i$, internal thermoverter circuits are provided which develop two voltages, of magnitudes $$(e/2 \text{ plus } i)$$

and $$(e/2 \text{ minus } i)$$

respectively. These two voltages are each impressed, through suitable resistance, upon a thermocouple, and the two thermocouples develop D.C. voltages which are proportional to $(e/2 \text{ plus } i)^2$ and $(e/2 \text{ minus } i)^2$, respectively. The D.C. thermocouple voltages are internally connected in series opposition and their net difference, equal to $$(e^2/4 \text{ plus } ei \text{ plus } i^2) \text{ minus } (e^2/4 \text{ minus } ei \text{ plus } i^2) \text{ equals } 2ei$$

appears at the thermoverter output terminal. When both $e$ and $i$ are vector quantities this product, $2ei$, is a vector product having a magnitude $2ei \cos\theta$, where $\theta$ is the angle between the vectors $e$ and $i$, and is proportional to the power in the A.C. circuit. The complete proof of the preceding is contained in the literature of the art, and need not be repeated here.

Consider the thermoverter element $T_1$ (73) of FIGURE 3. The current element in series with the impedance $\dot{Z}_{mn}$, is connected between the left-hand terminal at an A.C. voltage $E_m\angle\delta_m$ above ground, and the right-hand terminal at voltage $E_n\angle\delta_n$ above ground. The current flowing in the current element is, $$i=(E_m\underline{/\delta_m}-E_n\underline{/\delta_n})Y_{mn}\underline{/90-\phi_{mn}}=$$

$$E_mY_{mn}\underline{/90-\phi_{mn}+\delta_m}-E_nY_{mn}\underline{/90-\phi_{mn}+\delta_n}$$

The voltage across the voltage element at the thermoverter is, $E_n\angle\delta_n$. The D.C. output voltage of the thermoverter is the power which, as is well known, is equal to the real part of the product of the conjugate of the vector current and the vector voltage, or $$E_{dc(1)}=\text{Real part of }\{E_m^2Y_{mn}\underline{/-90+\phi_{mn}}-E_mE_nY_{mn}\underline{/-90+\phi_{mn}-\delta_n+\delta_m}\}$$
$$=E_m^2Y_{mn}\cos(-90+\phi_{mn})-E_mE_nY_{mn}\cos(-90+\phi_{mn}-\delta_n+\delta_m)$$
$$=E_m^2Y_{mn}\sin\phi_{mn}-E_mE_nY_{mn}\sin(\phi_{mn}+\delta_{mn})$$

In thermoverter $T_2$ (74), FIGURE 3, the current is $$i=E_mY_{mn}\underline{/90-\phi_{mn}+\delta_m}\text{; and the voltage is:}$$
$$e=E_m\underline{/\delta_m}$$

and the D.C. output voltage is $E_{dc(2)}=E_m^2Y_{mn}\sin\phi_{mn}$. By connecting the output of $T_1$ and that of $T_2$ in series opposition, the net difference voltage is obtained, equal to $$E_{dc(2)}-E_{dc(1)}=+E_mE_nY_{mn}\sin(\phi_{mn}+\delta_{mn})$$

Similarly, for thermoverter $T_3$, the current is $$i=(E_m\underline{/\delta_m}-E_n\underline{/\delta_n})Y_{mn}\underline{/\phi_{mn}-90}$$
$$=E_mY_{mn}\underline{/\phi_{mn}-90+\delta_m}-E_nY_{mn}\underline{/\phi_{mn}-90+\delta_n}$$

The voltage is, $E_n\angle\delta_n$; and the D.C. output voltage is $$E_{dc(3)}=E_m^2Y_{mn}\sin(\phi_{mn})-E_mE_nY_{mn}\sin(\phi_{mn}-\delta_{mn})$$

For thermoverter $T_4$ the output is $$E_{dc(4)}=E_m^2Y_{mn}\sin(\phi_{mn})$$

and the difference voltage $$E_{dc(4)}-E_{dc(3)}=+E_mE_nY_{mn}\sin(\phi_{mn}-\delta_{mn})$$

It will be noted that $e_{dc2}$ minus $e_{dc1}$ differs from $e_{dc4}$ minus $e_{dc3}$ only in the sign of the $\delta_{mn}$ term, and it will be recalled that terms of both forms appear in the discriminants previously derived.

The critical reader will note that $e_{dc4}$ equals $e_{dc2}$ and will question the necessity of including thermoverter $T_4$ at all. It will later be seen that it is necessary to keep the difference voltage $e_{dc2}$ minus $e_{dc1}$ electrically insulated from the voltage $e_{dc4}$ minus $e_{dc3}$ at times, and, for this reason the element $T_4$ must be retained.

Previous reference has been made to the fact that in some instances the magnitude and angle of a transfer admittance may vary sufficiently, as a consequence of variation in certain loads, to require compensation in the instrument structure. This compensation is provided by removing the four impedances shown in FIGURE 3(B) and replacing them with four other impedances of slightly different values. It is to be understood that to compensate for a change in any one transfer admittance, the impedances in one and only one group are replaced.

Since the probable error in determining a transfer admittance is plus or minus 2% at best, it is not necessary to provide compensation for any variation in any transfer admittance unless it exceeds plus or minus 2%. When any group of four impedances is replaced by another group, to compensate for such a variation in the associated transfer admittance, the change in impedance value will, properly, be twice the probable error, or plus or minus 4%.

As previously described, the structure involved in substituting one group of four impedances for another group is readily provided by any competent technician, skilled in the art, and no needed purpose is served by complicating the drawings and specifications through inclusion of these details.

In a three source system there would be 3/2(3 minus 1) groups (3 groups) of impedance elements such as shown in FIGURE 3(B), and these three groups would, when the "switched thermoverters" "Units B" of FIG- URE 1, were properly connected, develop six direct current voltages as follows:

| Voltage at left terminal | Voltage at right terminal | D.C. output voltages | Item | Impedance group |
|---|---|---|---|---|
| $E_1/\underline{\delta_1}$ | $E_2/\underline{\delta_2}$ | $E_1E_2Y_{12}\sin(\phi_{12}+\delta_{12})$ | *a* | $\dot{Z}_{12}$ |
| $E_1/\underline{\delta_1}$ | $E_2/\underline{\delta_2}$ | $E_1E_2Y_{12}\sin(\phi_{12}-\delta_{12})$ | *b* | $\dot{Z}_{12}$ |
| $E_2/\underline{\delta_2}$ | $E_3/\underline{\delta_3}$ | $E_2E_3Y_{23}\sin(\phi_{23}+\delta_{23})$ | *c* | $\dot{Z}_{23}$ |
| $E_2/\underline{\delta_2}$ | $E_3/\underline{\delta_3}$ | $E_2E_3Y_{23}\sin(\phi_{23}-\delta_{23})$ | *d* | $\dot{Z}_{23}$ |
| $E_1/\underline{\delta_1}$ | $E_3/\underline{\delta_3}$ | $E_1E_3Y_{13}\sin(\phi_{13}+\delta_{13})$ | *e* | $\dot{Z}_{13}$ |
| $E_1/\underline{\delta_1}$ | $E_3/\underline{\delta_3}$ | $E_1E_3Y_{13}\sin(\phi_{13}-\delta_{13})$ | *f* | $\dot{Z}_{13}$ |

Now refer back to the mathematical development and notice that in the expression for the discriminant $D_1$;

The coefficient of $F'_1$ is item *a* plus item *e*
The coefficient of $F'_2$ is item *b* with sign reversed
The coefficient of $F'_3$ is item *f* with sign reversed
The denominator is item *a* plus item *e*.

Note that, except for the F′ terms, all of the quantities appearing in the expression for $D_1$ are available as D.C. voltages by properly connecting the outputs of thermoverters switched into two of the three impedance groups, 1–2 and 1–3.

It will also be observed that all similar quantities appearing in the expression for $D_2$ are available by switching thermoverters into groups 1–2 and 2–3; and for $D_3$ the requisite impedance groups are 2–3 and 1–3. For a system of any number of sources, outputs of any *n* minus 1 groups (of a total of $n/2(n$ minus 1) groups) can be connected to deliver D.C. voltages equal to all terms (excluding the F′ terms) which appear in the expression for any one of the *n* discriminants.

In the block diagram, FIGURE 1(A—A), there are shown three boxes, 100, 101 and 102, labelled "Multiplying Means" and "FIG. 4." To these boxes are brought by the lines 103, 104 and 105 the, in this case, three voltages, shown as $1/F'_1$, $1/F'_2$ and $1/F'_3$, which are the outputs at three boxes labelled "A" (FIG. 2), and previously described herein, in which boxes these voltages are developed. Also, to such "Multiplying Means" there are brought by the lines 106, 107 and 108, certain selected voltages from the group of voltages developed in the "Switched Thermoverters" arranged as shown in said FIGURE 3(B) previously described herein. These voltages are, in each instance, the coefficient of the respective F′ term in the cost equation, as developed in the preceding mathematical treatment, and are designated as $E_k$ in the following description (and also so designated on FIGURE 4(D)). The construction of one such multiplying means is shown in said FIGURE 4(D); and that of the selecting means by which the proper combination of output voltages from the switched thermoverters to produce the respective $E_k$ voltages so selected, is shown in said FIGURE 5(C), presently to be described. However, FIGURE 4(D) is first described as this procedure will simplify an understanding of said FIGURE 5(C).

In FIGURE 4(D) there are shown three self-balancing potentiometers 109, 110 and 111, corresponding to the three sources under study. The following explanation will be directed to such self-balancing potentiometer #1, (109), at the top of the figure, but, with appropriate changes in nomenclature, shall apply equally to either of the other two potentiometers, #2, 110, and #3, 111, therein shown.

A voltage $E_{k1}$ developed in Unit "C," FIGURE 5, hereinafter, is impressed across the terminals *a* and *b* (FIGURE 4). A second voltage $E_1$ equal to $1/F'_1$, and developed in FIGURE (A) as previously described, is impressed across the center tapped potentiometer element of the self-balancing potentiometer. The motor driven slider of this center tapped potentiometer may be driven to any point along the resistance element and between the slider and the center tap fraction *n* of the voltage $E_1$, equal to $1/F'_1$ will exist, the slider being positive or negative with respect to the center tap depending upon whether it is above or below it in the diagram. The difference between this voltage, plus or minus $E_1$ equals plus or minus $n(1/F'_1)$, and the voltage $E_{k1}$ is impressed through the chopper and the amplifier on the motor, causing the motor to drive the slider in a direction to reduce this difference voltage to zero, when balance is attained:

$$n\frac{1}{F_1'}=E_{k1} \text{ where } E_{k1} \text{ maybe positive or negative}$$

or $$n=\pm F_1'E_{k1}$$

A second center tapped potentiometer 121 is provided with its slider also driven by the servo-motor and mechanically coupled to the first mentioned slider so that the fraction *n* of the total potentiometer resistance between the slider and the center taps of both potentiometers is at all times identical. Across each half resistance of the second center tapped potentiometer there is impressed a constant voltage *v* which is shown for simplicity in the diagram (FIGURE 4(D)) as derived from batteries. Actually other sources of this voltage *v*, would probably be more desirable in practice, but use of batteries tends to simplify both the diagram and the explanation. When the slider is at any position in the first mentioned potentiometer the fraction of the full resistance of that element is *n* equals plus or minus $F_1'E_k$ as previously described. At that instant the voltage developed between the center tap and slider of the second mentioned potentiometer will be $v_1$ equals plus or minus $nv$ equals plus or minus $F_1'E_{k1}v$.

Similarly, the second self-balancing potentiometer, supplied by voltages $E_{k2}$ and $1/F'_2$, produces an output voltage $v_2$ equals plus or minus $F'_2E_{k2}v$.

Also, the third self-balancing potentiometer, supplied by voltages $E_{k3}$ and $1/F'_3$, produces an output voltage $v_3$ equals plus or minus $F'_3E_{k3}v$.

By connecting the potentiometers developing the voltages $v_1$, $v_2$ and $v_3$ in series as shown in FIGURE 4(D), a total voltage $E_{output}$ is obtained such that $$\begin{aligned}E_{output}&=v_1+v_2+v_3\\&=\pm E_{k1}F'_1\pm E_{k2}F'_2\pm E_{k3}F'_3\end{aligned}$$

Refer now to FIGURE 5(C), which includes three boxes representing the three multiplying circuits of FIGURE 4(D) with the terminals *a* through *f* of said FIGURE 4(D) individually identified in FIGURE 5(C). Also shown are three groups of relay contacts labelled 1, 2 and 3, respectively. When contacts 1 are closed, the others remaining open, connections are established leading to the indication of the quantity $D_1$, the discriminant for Source 1 as previously defined. Similarly, closure of contacts 2 leads to the indication of $D_2$, etc.

When contacts 1 are closed, four circuits are established as follows:

Circuit 1; From terminal *a* to the positive terminal of the voltage $E_1E_2Y_{12}\sin(\phi_{12}+\delta_{12})$ which is permanently connected in series additively with the voltage $E_1E_3Y_{13}\sin(\phi_{13}+\delta_{13})$, and from the negative terminal of that voltage to terminal *b*. Thus $E_{k1}$ is the sum of these two voltages, and, since terminal *a* is positive relative to *b*, $$\begin{aligned}v_1=E_{k1}F'_1=F'_1[&E_1E_2Y_{12}\sin(\phi_{12}+\delta_{12})\\&+E_1E_3Y_{13}\sin(\phi_{13}+\delta_{13})]\end{aligned}$$

Circuit 2; From *d* to the positive terminal of the voltage $E_1E_2Y_{12}\sin(\phi_{12}-\delta_{12})$ and from the negative terminal of this voltage to terminal $c$. Since terminal $c$ is negative relative to terminal $d$, $$E_{k2}=-E_1E_2Y_{12}\sin(\phi_{12}-\delta_{12})$$

and $$v_2=E_{k2}F'_2=-F'_2[E_1E_2Y_{12}\sin(\phi_{12}-\delta_{12})]$$

Circuit 3; From terminal $f$ to the positive terminal of the voltage $E_1E_3Y_{13}\sin(\phi_{13}-\delta_{13})$ and from the negative terminal of this voltage to terminal $e$. Since terminal $e$ is negative relative to terminal $f$, $$E_{k3}=-E_1E_3Y_{13}\sin(\phi_{13}-\delta_{13})$$

and $$v_3=E_{k3}F'_3=-F'_3[E_1E_3Y_{13}\sin(\phi_{13}-\delta_{13})]$$

The output voltage of the series connected multiplying circuits is $$v_1+v_2+v_3=\{F'_1[E_1E_2Y_{12}\sin(\phi_{12}+\delta_{12})+E_1E_3Y_{13}\sin(\phi_{13}+\delta_{13})]-F'_2[E_1E_2Y_{12}\sin(\phi_{12}-\delta_{12})]-F'_3[E_1E_3Y_{13}\sin(\phi_{13}-\delta_{13})]\}v$$

which is the numerator of the discriminant $D_1$ as developed in the preceding mathematical treatment, multiplied by the constant V. This voltage is passed by the line 130, to the block labelled "Self-Balancing Voltmeter" and "Dividing Means" 131 in the diagram (A—A), FIGURE 1, and also there legended "E" (FIG. 6).

The fourth circuit established when the contacts 1 of FIGURE 5(C) are closed is similar to the first and develops the voltage indicated $E_{D1}$ at the left-hand side of FIGURE 5(C). It is the same voltage as is impressed between the terminals $a$ and $b$, and is fed through additional 1 switch contacts to the just mentioned self-balancing potentiometer voltmeter of FIGURE 1(A).

It is easily seen that when contacts 2 are closed, the voltage $v_1$ plus $v_2$ plus $v_3$ is $$\{-F'_1[E_1E_2Y_{12}\sin(\phi_{12}+\delta_{12})]+F'_2[E_1E_2Y_{12}\sin(\phi_{12}-\delta_{12})+E_2E_3Y_{23}\sin(\phi_{23}+\delta_{23})]-F'_3[E_2E_3Y_{23}\sin(\phi_{23}-\delta_{23})]\}v$$

and if contacts 3 are closed, $v_1$ plus $v_2$ plus $v_3$ equals $$\{-F'_1[E_1E_3Y_{13}\sin(\phi_{13}+\delta_{13})]-F'_2[E_2E_3Y_{23}\sin(\phi_{23}+\delta_{23})]+F'_3[E_1E_3Y_{13}\sin(\phi_{13}-\delta_{13})+E_2E_3Y_{23}\sin(\phi_{23}-\delta_{23})]\}v$$

In each instance these voltages are the exact numerator of the incremental cost discriminant multiplied by the constant V, and include a term equal to the exact denominator of that same discriminant.

By way of illustration, if the system involved only two sources, 1 and 2, and one load center at which it is desired to meter the incremental cost of delivered power at bus 3; only two multiplying circuits (#1 and #2) would be needed, but all three switch positions would still be required. If multiplying means #3 were disconnected at $e$ and $f$, and $e$ connected to $f$, the self-balancing potentiometer would move the slider to $v_3$ equals zero, and the numerator and denominator voltages delivered to the self-balancing potentiometer voltmeter block of FIGURE 1(A) would be the correct values to cause that instrument to indicate incremental cost of delivered power at load bus 3 when contacts 3 were closed. This is an important advantage. If bus 3 were an interchange point it would have to be treated as a generator of incremental cost $F'_3$ determined by the interchange contract when power is flowing IN to the present system. When the flow is reversed the simple switch operation just described relative to multiplying means #3 cause the remaining structure to indicate the incremental cost of the power flowing out to the adjacent system.

It has been shown that by closing a selected group of relay contacts in Unit (C), FIGURE 5, a voltage equal to the numerator of any discriminant is delivered by the line 130 to the "self-balancing potentiometer voltmeter" box "E" (131) of FIGURE 1(A—A), and a second voltage equal to the denominator of the same discriminant is also delivered by the line 132 to said box. The structure included in this box is shown in schematic form in FIGURE 6(E). Since self-balancing potentiometer voltmeters are a fully developed commercial item, FIGURE 6(E) includes only those general features necessary to demonstrate the application of this type of instrument to accomplish the operation required in this disclosure.

In FIGURE 6(E) are shown a self-balancing potentiometer 133 (upper), and a second self-balancing potentiometer voltmeter 134 (lower). The upper potentiometer (133) adjusts the fraction $n$ of the full resistance until the difference voltage impressed through the chopper and amplifier on the motor is zero, when $E_D$ equals $nv$, or $n$ equals $E_D/v$ This voltage output of the second voltage dividing potentiometer 134, driven by the same motor, is then $nv$ equals $E_Dv/v$, equals $E_D$ This voltage is impressed across the motor adjusted potentiometer of the lower self-balancing potentiometer voltmeter 134. This unit adjusts the fraction $m$ until the difference voltage impressed through the chopper and amplifier on the motor is zero, when, the switch 135 being closed to the "$a$" position shown in FIGURE 6(E), $E_n$ equals plus or minus $mE_D$, or
$m$ equals plus or minus $E_n/E_D$, equals plus or minus the numerator of discriminant/denominator of discriminant, equals plus or minus discriminant.

It will be recalled that the voltage $E_n$ as developed in FIGUURE 4(D) is multiplied by a constant $v$. By suitable choice of circuit constants this quantity can be made, $v$ equals 1. Then the quantity $m$ as indicated by the pointer 136 travelling across scale $a$ (of FIGURE 6 (E)) is the discriminant shown in both magnitude and sign.

When the switch 135 is moved to position $b$, the voltage $m'E_D$ is always positive and must be compared with a positive $E_n$ if a reading is to result. When the instrument is employed to indicate the incremental cost of delivered power at an interconnection point, as described previously herein, $E_n$ is always positive and with the switch 135 in the position $b$, a correct indication will be obtained. Further, this allows the full scale length for the indication of what may be a substantial quantity as contrasted to operation for indication of discriminants which are, desirably, zero and require less scale length to display them.

The downwardly pointing arrow 137 of FIGURE 6(E) indicates a mechanical connection to the shaft of an analog to digital converter, a commercially available device shown in the block diagram of FIGURE 1(A—A), by the block 138, as optional equipment, and there legended "Digital Converter." This converter can be caused to generate polarized voltages which when applied to a commercially available printer 139 will print out on tape the quantity indicated by the pointer 136 on the scale $a$ (FIGURE 6(E)). By further appropriate structure print out of scale $b$ indications can also be provided, but for quantities indicated on scale $b$ a permanent record is probably not often important.

Block diagram, FIGURE 1(A—A) shows a push-button bank 140 whereby the load dispatcher may operate relay contact group 1, 2 or 3 (indicated in FIGURE 1), as desired, to produce the indication of discriminant $D_1$, $D_2$ or $D_3$, respectively. In a system of 10 or more sources it may be inconvenient to select the next reading manually, and difficult to keep in mind the magnitude and sign of that number of discriminants. The latter objection is overcome through addition of the print out feature previously mentioned. Push button selection is also avoidable through provision of a self-stopping switch 141 which on command will consecutively operate each contact group with provision for sufficient time delay shown by the line 142 in FIGURE 1(A—A), between steps to assure the switched thermoverters time to reach stable output voltages. Such an arrangement is schematically shown in FIGURE 1(A—A). The printer will then print every discriminant in succession, and stop until further complete series of readings is called, as by depression of the "start-stop" button 143 (shown in FIGURE 1). The techniques for accomplishing these automated printings are also commercially available.

It is now necessary to consider the modifications in the disclosed structure which may be desirable when a synchronous condenser, 144 (shown in FIGURE 1, A—A) is added to the system, in order to coordinate the structure with the equations developed mathematically for this condition. These equations show that the addition of such condenser to a general mesh, is to introduce one additional term into the coefficient of some, and possibly all, of the coefficients of the F′ quantities.

To allow comparison with the preceding, and to avoid unnecessary complication of the diagrams, the structure shown in FIGURE 7(F), and in FIGURE 8(C′) is directed to a system of two sources, 1 and 2, and one synchronous condenser, 4: bus 3 being eliminated. Extension of the structure to any number of generators and/or condensers will be readily accomplished by following the principles disclosed.

In FIGURE 7(F) there are shown (upper and lower right corners) four voltages developed by switching thermoverters into circuitry such as shown in FIGURE 3(B). These are D.C. voltages of the magnitudes indicated by notation, and the manner in which they are obtained is exactly analogous to the methods described in detail in connection with said FIGURE 3(B). In all cases the upper terminal is identified as positive. Two groups of contacts, 1 and 2, are shown and it is to be understood that each number group is operated simultaneously with the similarly numbered group in FIGURE 8(C′).

When contacts 1 are closed the voltages $$E_1E_4Y_{14}\sin(\phi_{14}-\delta_{14})\text{ and }E_2E_4F_{24}\sin(\phi_{24}-\delta_{24})$$

are connected in series additively. The upper 145, of the two self-balancing potentiometers adjusts a pair of motor driven sliders 146 and 147 until the fraction $n$ of the voltage $v$ is equal to the total or sum voltage of the preceding sentence, when $$nv=E_1E_4Y_{14}\sin(\phi_{14}-\delta_{14})+E_2E_4Y_{24}\sin(\phi_{24}-\delta_{24})$$

An equal voltage, $nv$, developed at the second slider 147 is impressed across the voltage divider driven by the lower self-balancing potentiometer 148. The slider 149 of this voltage divider is driven by the associated motor until the fraction $m$ of thce voltage $nv$ is equal to the voltage $E_1E_4Y_{14}\sin(\phi_{14}-\delta_{14})$ when $$mnv=m[E_1E_4Y_{14}\sin(\phi_{14}-\delta_{14})+E_2E_4Y_{24}\sin(\phi_{24}-\delta_{24})]=E_1E_4Y_{14}\sin(\phi_{14}-\delta_{14})$$

or $$m=\frac{E_1E_4Y_{14}\sin(\phi_{14}-\delta_{14})}{E_1E_4Y_{14}\sin(\phi_{14}-\delta_{14})+E_2E_4Y_{24}\sin(\phi_{24}-\delta_{24})}$$

The motor 150 of this (lower) self-balancing potentiometer also drives two other potentiometers 151 and 152 supplied with voltages as stated in the notation. The fraction m of each of these is delivered at the terminals $w$, $x$, $y$ and $z$. When contacts 1 are closed these voltages are at $w$–$x$;

$$\frac{[E_1E_4Y_{14}\sin(\phi_{14}+\delta_{14})]\cdot[E_1E_4Y_{14}\sin(\phi_{14}-\delta_{14})]}{E_1E_4Y_{14}\sin(\phi_{14}-\delta_{14})+E_2E_4Y_{24}\sin(\phi_{24}-\delta_{24})}$$

and at $y$–$z$;

$$\frac{[E_2E_4Y_{24}\sin(\phi_{24}+\delta_{24})]\cdot[E_1E_4Y_{14}\sin(\phi_{14}-\delta_{14})]}{E_1E_4Y_{14}\sin(\phi_{14}-\delta_{14})+E_2E_4Y_{24}\sin(\phi_{24}-\delta_{24})}$$

Similarly, when contacts 2 are closed, the voltage delivered to FIGURE 8(C′) is at $w$–$x$;

$$\frac{[E_1E_4Y_{14}\sin(\phi_{14}+\delta_{14})]\cdot[E_2E_4Y_{24}\sin(\phi_{24}-\delta_{24})]}{E_1E_4Y_{14}\sin(\phi_{14}-\delta_{14})+E_2E_4Y_{24}\sin(\phi_{24}-\delta_{24})}$$

and at $y$–$z$;

$$\frac{[E_2E_4Y_{24}\sin(\phi_{24}+\delta_{24})]\cdot[E_2E_4Y_{24}\sin(\phi_{24}-\delta_{24})]}{E_1E_4Y_{14}\sin(\phi_{14}-\delta_{14})+E_2E_4Y_{24}\sin(\phi_{24}-\delta_{24})}$$

The critical reader will notice that the central groups (1 and 2, FIGURE 7(F)) appear more complex than necessary. The diagram has been drawn in the form necessary for more than two generators and under this condition the order in which the voltages (at the upper right) are series connected, is critical. For this reason contacts are provided in FIGURE 7(F) to alter the sequence of the series connected voltages in a manner analogous to that necessary when three or more sources are involved.

It may also be suggested that in FIGURES 6(E) and 7(F) it is not necessary to provide two self-balancing potentiometers as the desired division can be accomplished with only one. However, in each case the divisor is a denominator voltage generated by a thermoverter, or a series connected group of thermoverters, which is at a very low energy level. Only a voltage divider of the order of a megohm or, preferably, higher, could be used without loss of accuracy due to the load current in the thermocouple junctions. A dividing resistor of adequate resistance is not desirable when the slider is servo-motor operated for obvious reasons. While the same argument seems to apply to the voltage dividers 151 and 152 at the lower right in FIGURE 7(F) it is not so compelling in this instance as these sliders 153 and 154 are not in the actual balancing circuit of the self-balancing potentiometers, although driven by it. The necessary structure to completely avoid loading at these circuits will be apparent from the figure and can be adopted if found desirable; but as a matter of engineering judgment it is felt the structure shown is adequate if the voltage dividing components are carefully selected.

FIGURE 8(C′) shows the modification of FIGURE 5 (C) when source bus 3 is eliminated and synchronous condenser bus 4 is added. The deletion of one source eliminates one multiplying circuit necessary in FIGURE 5 (C); otherwise the figures are generally similar. When contacts 1 in FIGURE 8 (C′) are closed a voltage $$=E_1E_2Y_{12}\sin(\phi_{12}+\delta_{12})+E_1E_4Y_{14}\sin(\phi_{14}+\delta_{14})-\frac{[E_1E_4Y_{14}\sin(\phi_{14}+\delta_{14})]\cdot[E_1E_4Y_{14}\sin(\phi_{14}-\delta_{14})]}{E_1E_4Y_{14}\sin(\phi_{14}-\delta_{14})+E_2E_4Y_{24}\sin(\phi_{24}-\delta_{24})}$$

is impressed on terminals $a$–$b$ of the multiplying circuit (Multiplying Means No. 1) of FIGURE 8(C′), with terminal $a$ positive. Reference to the mathematical development will show that this is the coeficient of $F_1'$ in the $D_1$ discriminant when source 3 is eliminated. At the same time the voltage equals $$=E_1E_2Y_{12}\sin(\phi_{12}-\delta_{12})-\frac{[E_2E_4Y_{24}\sin(\phi_{24}+\delta_{24})]\cdot[E_1E_4Y_{14}\sin(\phi_{14}-\delta_{14})]}{E_1E_4Y_{14}\sin(\phi_{14}-\delta_{14})+E_2E_4Y_{24}\sin(\phi_{24}-\delta_{24})}$$

is impressed on terminals $c$–$d$ of the multiplying circuit (No. 2) of FIGURE 8(C′), with terminal $c$ negative. Reference to the mathematical development will show that this is the negative of the coeficient of $F_2'$ in $D_1$ discriminant when source 3 is eliminated. Accordingly, the numerator and denominator voltages delivered to the self-balancing potentiometer voltmeter will be such that that instrument will correctly indicate the magnitude and sign of the discriminant $D_1$ with the synchronous condenser operating.

When contacts 2 are closed the voltage $$E_1E_2Y_{12}\sin(\phi_{12}+\delta_{12})-\frac{E_2E_4Y_{14}\sin(\phi_{14}+\delta_{14})\cdot E_2E_4Y_{24}\sin(\phi_{24}-\delta_{24})}{E_1E_4Y_{14}\sin(\phi_{14}-\delta_{14})+E_2E_4Y_{24}\sin(\phi_{24}-\delta_{24})}$$

is impressed at terminals $a$–$b$ of Multiplying Circuit No. 1, with terminal $a$ negative. Reference to the mathematical development will show that this is the negative of the coefficient of $F_1'$ in the discriminant $D_2$ when source 3 is eliminated and with contacts 2 closed the voltage $$E_1E_2Y_{12}\sin(\phi_{12}-\delta_{12})+E_2E_4Y_{24}\sin(\phi_{24}+\delta_{24})-\frac{E_2E_4Y_{24}\sin(\phi_{24}+\delta_{24})\cdot E_2E_4Y_{24}\sin(\phi_{24}-\delta_{24})}{E_1E_4Y_{14}\sin(\phi_{14}-\delta_{14})+E_2E_4Y_{24}\sin(\phi_{24}-\delta_{24})}$$

appears at terminals $c$–$d$ of Multiplying Means No. 2, with terminal $c$ positive. It will be noted that this is the coefficient of $F_2'$ in the discriminant $D_2$, when source 3 is eliminated.

In summary, it will be apparent that, in contrast to all prior art, this disclosure does not require that the power output of any source be actually incrementally increased in order to measure the effect of such an increment on incremental fuel cost. The several steps of the development, as shown in the early portion of this specification, show that the effect of any actual power increment can be exactly predicted through direct measurement of power system parameters as they exist at any instant. This application discloses the structure through which these parameters are measured, and these measurements are combined to produce an indication of the magnitude and algebraic sign of a set of discriminants fully indicative of the adjustments in load allocation which are necessary to attain minimum hourly fuel cost without either ($a$) Producing an increment in power output at any source in order to observe the effect thereof, either in the actual system or in a model thereof, or ($b$) Measuring, computing, or otherwise establishing the incremental transmission loss incident to such an increment in output at a selected source.

I claim:

1. Means to indicate the increment in total hourly fuel cost of an electric power system, incident to a proposed transfer of power to a selected one of a plurality of power sources by an incremental advance in the phase position of the vector voltage at the terminals of the said selected source relative to the phase positions of the vector voltages at the terminals of the non-selected of the said plurality of power sources; said means including means responsive to the power output of each power source, individually, and establishing a first group of voltages representative of the incremental cost of power generated by each power source, individually; means responsive to the vector voltage at the terminals of the said selected power source and to the vector voltage at the terminals of each of the non-selected of the said plurality of power sources and to the complex transfer admittance between the respective pairs of the said terminals and establishing a second group of voltages representative of the increment in power output of each power source consequent upon the said incremental advance in phase position; means for establishing a third group of voltages through the operation of each of the said first group of voltages upon a suitably selected one of said second group of voltages; means for the summation of the said third group of voltages; and means for the operation upon the sum of said third group of voltages by the sum of selected ones of the said second group of voltages.

2. Means as defined in claim 1, together with additional means for use under the operating condition that the electric power system includes an interconnection with another power system, in which interconnection power flow is, presently, to the said other system; said additional means being constituted for the adjustment of one of the said first group of voltages to zero, whereby the said operation upon the sum of the said third group of voltages by the sum of selected ones of the said second group of voltages produces an effect representative of the incremental cost of power delivered to the other system at the said interconnection.

3. Means as defined in claim 1, together with additional means for use under the operating condition that the power output of at least one of the non-selected of the said plurality of said power sources is constrained to remain substantially constant; said additional means including; a first additional means responsive to the vector voltage at the terminals of such constrained power source, and to the vector voltage at the terminals of each of the non-constrained of the said plurality of power sources, and to the complex transfer admittance between the respective pairs of said terminals, and constituted to produce an effect representative of a correction to each of the said second group of voltages consequent upon the said operating condition; and a second additional means constituted to accomplish the algebraic addition of a correction effect produced by the said first additional means to each of the said second group of voltages, respectively.

4. Means, including two pairs of input terminals, to produce a continuous output voltage proportional to the quantity $E_jE_kY_{jk}\sin(\phi_{jk}+\delta_j-\delta_k)$ when an alternating voltage $E_j\angle\delta_j$ is impressed at one of said pairs of input terminals and an alternating voltage $E_k\angle\delta_k$ is impressed at the other of said pairs of input terminals, said means including two impedances each of magnitude proportional to the reciprocal of the magnitude of $Y_{jk}$ and of impedance angle $(\phi-90°)$, two power measuring units, each including output terminals and means to develop at the output terminals of each such power measuring unit a continuous voltage proportional to the power measured by such power measuring unit, said output developing means of each power measuring unit also including a voltage responsive element and a current responsive element, connections between the first of the said pairs of input terminals and the voltage responsive elements of each of the power measuring units, connections including in series relationship one of said impedances and the current responsive element of one of the power measuring units between one terminal of said first pair of input terminals and one of the terminals of the second of said pairs of input terminals, connections including in series relationship the other of said impedances and the current responsive element of the other of the power measuring units between one terminal of the first of said pairs of input terminals and the second terminal of the second of said pairs of input terminals together with means to connect the output voltage of one of said power measuring units in series opposition with the output voltage of the other of said power measuring units.

5. Means, including two pairs of input terminals, to produce a continuous output voltage proportional to the quantity $E_jE_kY_{jk}\sin(\phi_{jk}-\delta_j+\delta_k)$ when an alternating voltage $E_j\angle\delta_j$ is impressed at one of said pairs of input terminals and an alternating voltage $E_k\angle\delta_k$ is impressed at the other of said pairs of input terminals, said means including two impedances each of magnitude proportional to the reciprocal of the magnitude of $Y_{jk}$ and of impedance angle $-(\phi-90°)$, two power measuring units, each including output terminals and means to develop at the output terminals of each such power measuring unit a continuous voltage proportional to the power measured by such power measuring unit, said output developing means of each power measuring unit also including a voltage responsive element and a current responsive element, connections between the first of said pairs of input terminals and the voltage responsive elements of each of the power measuring units, connections including in series relationship one of said impedances and the current responsive element of one of the power measuring units between one terminal of said first pair of input terminals and one of the terminals of the second of said pairs of input terminals, connections including in series relationship the other of said impedances and the current responsive element of the other of the power measuring units between one terminal of the first of said pairs of input terminals and the second terminal of the second of said pairs of input terminals together with means to connect the output voltage of one of said power measuring units in series opposition with the output voltage of the other of said power measuring units.

References Cited by the Examiner

UNITED STATES PATENTS 2,841,331 7/58 Starr et al. ............ 235—184

2,871,374 1/59 Early ................ 235—185
3,027,085 3/62 Evans ................ 235—193

OTHER REFERENCES

"Electronic Analog Computers," Korn and Korn. McGraw-Hill 1952. QA–76.4–k6–C.2. Pp. 33, 36, 37, and 41.

MALCOLM A. MORRISON, *Primary Examiner.*

CORNELIUS D. ANGEL, *Examiner.*

UNITED STATES PATENT OFFICE
CERTIFICATE OF CORRECTION

Patent No. 3,173,002 March 9, 1965

James H. Starr

It is hereby certified that error appears in the above numbered patent requiring correction and that the said Letters Patent should read as corrected below.

Column 2, line 49, for "supplies" read -- supplied --; column 3, line 63, for "An" read -- Any --; columns 7 and 8, lines 18 and 19, for that portion of the numerator of the equation reading $\sin(\phi_{12}+\delta_{12})+$ read $\sin(\phi_{12}-\delta_{12})+$ column 10, near the bottom of the page, in the second line of the equation, for that portion reading $=E_3E_4Y_{34}$ read $-E_3E_4Y_{34}$ columns 11 and 12, after "Similary it can be shown;" approximately line 30, the long equation, the denominator reading $\frac{\partial P_2}{\partial \delta_2}+\frac{\partial P_2}{\partial \delta_2}\frac{\partial \delta_4}{\partial \delta_2}$ read $\frac{\partial P_2}{\partial \delta_2}+\frac{\partial P_2}{\partial \delta_4}\frac{\partial \delta_4}{\partial \delta_2}$ column 16, line 71, for "eequals" read -- equals --; column 21, lines 9 and 10, the equation should appear as shown below instead of as in the patent:

$$\frac{\text{a constant}}{(a_1+b_1P_1)\ (\text{cost of fuel at source 1})}$$

column 24, line 27, for "$E_n\angle\delta_n$" read -- $E_m\angle\delta_m$ --.

Signed and sealed this 22nd day of February 1966.

(SEAL)
Attest:

ERNEST W. SWIDER
Attesting Officer

EDWARD J. BRENNER
Commissioner of Patents